US008527477B2

(12) United States Patent
Yamaguchi et al.

(10) Patent No.: US 8,527,477 B2
(45) Date of Patent: Sep. 3, 2013

(54) DISPLAY SYSTEM, DISPLAY METHOD, DISPLAY PROGRAM, DISPLAY CONTROL METHOD AND DISPLAY APPARATUS

(75) Inventors: Hiroshi Yamaguchi, Kanagawa (JP); Akira Yoda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 838 days.

(21) Appl. No.: 11/849,482

(22) Filed: Sep. 4, 2007

(65) Prior Publication Data
US 2008/0059473 A1 Mar. 6, 2008

(30) Foreign Application Priority Data

Sep. 1, 2006 (JP) .................................. 2006-237276
Apr. 23, 2007 (JP) .................................. 2007-113444

(51) Int. Cl.
*G06F 17/30* (2006.01)
(52) U.S. Cl.
USPC .......................................... 707/694; 707/784
(58) Field of Classification Search
None
See application file for complete search history.

(56) References Cited

U.S. PATENT DOCUMENTS

| 6,256,636 | B1 * | 7/2001 | Choy ............................. 707/610 |
| 6,314,425 | B1 * | 11/2001 | Serbinis et al. ........................ 1/1 |
| 6,449,617 | B1 * | 9/2002 | Quinn et al. ............................ 1/1 |
| 2005/0187937 | A1 * | 8/2005 | Kawabe et al. .................... 707/9 |
| 2005/0207727 | A1 * | 9/2005 | Hirose et al. ..................... 386/46 |
| 2006/0161977 | A1 * | 7/2006 | Jung et al. ........................ 726/21 |
| 2009/0102419 | A1 * | 4/2009 | Gwon et al. ................... 320/108 |

FOREIGN PATENT DOCUMENTS

| JP | 2004-280236 A | 10/2004 |
| JP | 2005-267021 A | 9/2005 |
| JP | 2005-316672 A | 11/2005 |
| JP | 2005-327159 A | 11/2005 |
| JP | 2006-41801 A | 2/2006 |

OTHER PUBLICATIONS

Japanese Office Action dated Oct. 25, 2011.

* cited by examiner

*Primary Examiner* — Hosain Alam
*Assistant Examiner* — Sangwoo Ahn
(74) *Attorney, Agent, or Firm* — Sughrue Mion, PLLC

(57) ABSTRACT

A display system includes a display apparatus including a file identifier storing section, a viewing and editing information storing section storing thereon viewing and editing information permitted to file data, a first display section, and a first communicating section transmitting the file identifier and viewing and editing information, and an information processing apparatus including a second communicating section receiving the file identifier and viewing and editing information, a file data obtaining section, a viewing and editing instruction obtaining section obtaining editing instructions, a viewing and changing permitting section that refers to the viewing and editing information, and, when editing is permitted, gives permission to change contents of the file data based on the editing instructions, and a viewing and changing prohibiting section that refers to the viewing and editing information, and, when editing is not permitted, prohibits changing the contents of the file data.

14 Claims, 12 Drawing Sheets

230

| USER IDENTIFYING INFORMATION | FILE ID | VIEWING AND EDITING INFORMATION |
|---|---|---|
| USER IDENTIFYING INFORMATION 2000 | FILE ID 4000 | WORD PROCESSOR SOFTWARE 3000 |
| | FILE ID 4010 | VIEWING SOFTWARE 3010 |
| | ⋮ | ⋮ |
| USER IDENTIFYING INFORMATION 2010 | FILE ID 4000 | VIEWING SOFTWARE 3010 |
| | FILE ID 4010 | VIEWING SOFTWARE 3010 |
| | ⋮ | ⋮ |
| ⋮ | ⋮ | ⋮ |

| USER IDENTIFYING INFORMATION | FILE ID | VIEWING AND EDITING INFORMATION | | | |
|---|---|---|---|---|---|
| | | VIEW | SAVE | PRINT | ... |
| USER IDENTIFYING INFORMATION 2000 | FILE ID 4000 | OK | OK | NO | ⋮ |
| | FILE ID 4010 | OK | OK | OK | ⋮ |
| | ⋮ | ⋮ | ⋮ | ⋮ | ⋮ |
| USER IDENTIFYING INFORMATION 2010 | FILE ID 4000 | OK | NO | NO | ⋮ |
| | FILE ID 4010 | NO | NO | NO | ⋮ |
| | ⋮ | ⋮ | ⋮ | ⋮ | ⋮ |
| ⋮ | ⋮ | ⋮ | ⋮ | ⋮ | ⋮ |

| APPARATUS ID | RESOLUTION | COLOR DISPLAY | SCREEN SIZE |
|---|---|---|---|
| APPARATUS ID 5001 | 170 ppi | × | 6 × 6 INCHES |
| APPARATUS ID 5002 | 170 ppi | ○ | 3 × 5 INCHES |
| ⋮ | ⋮ | ⋮ | ⋮ |

*FIG. 6*

DISPLAY SYSTEM, DISPLAY METHOD, DISPLAY PROGRAM, DISPLAY CONTROL METHOD AND DISPLAY APPARATUS

CROSS REFERENCE TO RELATED APPLICATION

The present application relates to and claims priority from Japanese Patent Applications No. 2006-237276 filed in Japan on Sep. 1, 2006, and No. 2007-113444 filed in Japan on Apr. 23, 2007, the contents of which are incorporated herein by reference for all purpose.

BACKGROUND

1. Technical Field

The present invention relates to a display system, a display method, a display program, a display control method and a display apparatus. More particularly, the present invention relates to a display system which includes therein a display apparatus for displaying thereon file data and an information processing apparatus for allowing a user to edit the file data displayed on the display apparatus, a display method, a display program, a display control method and a display apparatus.

2. Related Art

A content distribution system has been proposed in, for example, Japanese Patent Application Publication No. 2006-41801. The content distribution system includes therein electronic paper that is provided with a tag storing thereon a medium ID identifying the electronic paper and a distribution management apparatus that distributes contents to the electronic paper. To be more specific, the distribution management apparatus reads medium IDs stored on the tags of a plurality of sheets of electronic paper, and determines contents to be distributed to each of the plurality of sheets of electronic paper. The distribution management apparatus then transmits the determined contents to a corresponding one of the plurality of sheets of electronic paper. Each sheet of electronic paper displays thereon the received contents.

A document processing system has been proposed in, for example, Japanese Patent Application Publication No. 2005-327159. The document processing system reads a document ID from electronic paper that is provided with a storing section storing thereon the document ID which identifies a document displayed on the electronic paper, and causes a predetermined output apparatus (such as a printer and an information terminal) to output the document data corresponding to the read document ID. Furthermore, an electronic paper display system has been proposed in, for example, Japanese Patent Application Publication No. 2005-316672. The electronic paper display system forwards display information, from a forwarding apparatus connected to a personal computer or the like, to a predetermined sheet of electronic paper which is wirelessly identified among a plurality of sheets of electronic paper.

The invention disclosed in the publication No. 2006-41801 has the following drawback. Even though a user desires to edit file data such as contents displayed on the electronic paper, the distribution management apparatus is designed only to distribute the contents to the electronic paper, and the user therefore can not edit the file data. The invention disclosed in the publication No. 2005-327159 has the following drawback. The document processing system can receive an identifier that identifies the file data displayed on the electronic paper, and cause the printer or the like to output the file data identified by the received identifier. However, no restriction is put on the edition of the file data according to the technique disclosed in this publication. Therefore, it may be difficult to protect the confidentiality of the file data. The invention disclosed in the publication No. 2005-316672 can display predetermined information on the electronic paper, but can not be used to edit the information displayed on the electronic paper.

SUMMARY

Therefore, it is an object of an aspect of the present invention to provide a display system, a display method, a display program, a display control method and a display apparatus which are capable of overcoming the above drawbacks accompanying the related art. The above and other objects can be achieved by combining the features described in the independent claims. The dependent claims define further advantageous and exemplary combinations of the present invention.

According to a first aspect related to the innovations herein, one exemplary system may include a display system having therein a display apparatus that displays thereon file data, and an information processing apparatus that enables a user to view or edit the file data displayed on the display apparatus. Here, the display apparatus includes a file identifier storing section that stores thereon a file identifier identifying the file data, a viewing and editing information storing section that stores thereon viewing and editing information which indicates a type of viewing or editing which is permitted to be performed on the file data identified by the file identifier stored on the file identifier storing section, a first display section that displays thereon the file data identified by the file identifier stored on the file identifier storing section, and a first communicating section that transmits, to the information processing apparatus, the file identifier stored on the file identifier storing section and the viewing and editing information stored on the viewing and editing information storing section. The information processing apparatus includes a second communicating section that receives the file identifier stored on the file identifier storing section and the viewing and editing information stored on the viewing and editing information storing section, a file data obtaining section that obtains the file data identified by the file identifier received by the second communicating section, a viewing and editing instruction obtaining section that obtains one or more instructions issued by the user to view or edit the file data, a viewing and changing permitting section that refers to the viewing and editing information received by the second communicating section, and when the file data obtained by the file data obtaining section is permitted to be viewed or edited, gives permission to view or change contents of the file data based on the viewing or editing instructions obtained by the viewing and editing instruction obtaining section, and a viewing and changing prohibiting section that refers to the viewing and editing information received by the second communicating section, and, when the file data obtained by the file data obtaining section is not permitted to be viewed or edited, prohibits viewing or changing the contents of the file data.

The viewing and editing information storing section may store thereon, as the viewing and editing information, (i) a type of editing-capable software which is application software capable of changing the contents of the file data or (ii) a type of editing-incapable software which is application software incapable of changing the contents of the file data, the first communicating section may transmit, as the viewing and editing information, the type of editing-capable or editing-incapable software stored on the viewing and editing information storing section, the second communicating section may receive, as the viewing and editing information, the type of editing-capable or editing-incapable software stored on the viewing and editing information storing section, the viewing and changing permitting section may give permission to change the contents of the file data, by opening the file data obtained by the file data obtaining section by using the type of editing-capable software which is received by the second communicating section, and the viewing and changing prohibiting section may prohibit changing the contents of the file data, by opening the file data obtained by the file data obtaining section by using the type of editing-incapable software which is received by the second communicating section.

The display apparatus may further include a user identifying information storing section that stores thereon user identifying information identifying the user, the information processing apparatus may further include a user identifying information obtaining section that obtains user identifying information input by the user and a user judging section that judges whether the user identifying information obtained by the user identifying information obtaining section is the same as the user identifying information stored on the user identifying information storing section, the first communicating section may further transmit the user identifying information stored on the user identifying information storing section, the second communicating section may further receive the user identifying information stored on the user identifying information storing section, the user judging section may judge whether the user identifying information obtained by the user identifying information obtaining section is the same as the user identifying information received by the second communicating section, when the user judging section judges positively, the viewing and changing permitting section may give permission to change the contents of the file data by opening the file data obtained by the file data obtaining section by using the type of editing-capable software received by the second communicating section, and when the user judging section judges negatively, the viewing and changing prohibiting section may prohibit changing the contents of the file data by opening the file data obtained by the file data obtaining section by using the type of editing-incapable software received by the second communicating section.

The user identifying information storing section may store thereon a plurality of pieces of user identifying information respectively identifying a plurality of users, the viewing and editing information storing section may store thereon, as the viewing and editing information, (i) the type of editing-capable software which is application software capable of changing the contents of the file data or (ii) the type of editing-incapable software which is application software incapable of changing the contents of the file data, in association with each of the plurality of pieces of user identifying information stored on the user identifying information storing section, the first communicating section may transmit the plurality of pieces of user identifying information stored on the user identifying information storing section, and, as the viewing and editing information, the type of editing-capable or editing-incapable software stored on the viewing and editing information storing section in association with each of the plurality of pieces of user identifying information, the second communicating section may receive the plurality of pieces of user identifying information stored on the user identifying information storing section, and, as the viewing and editing information, the type of editing-capable or editing-incapable software stored on the viewing and editing information storing section in association with each of the plurality of pieces of user identifying information, the user judging section may judge which one of the plurality of pieces of user identifying information received by the second communicating section is the same as the user identifying information obtained by the user identifying information obtaining section, and the viewing and changing permitting section may give permission to change the contents of the file data obtained by the file data obtaining section by opening the file data by using the type of editing-capable software which is received by the second communicating section and is associated with the piece of user identifying information that is judged to be the same as the user identifying information obtained by the user identifying information obtaining section.

The viewing and editing information storing section may store thereon, as the viewing and editing information, a type of edition which is permitted to be performed on the file data identified by the file identifier stored on the file identifier storing section, the first communicating section may transmit, as the viewing and editing information, the permitted type of edition which is stored on the viewing and editing information storing section, the second communicating section may receive, as the viewing and editing information, the permitted type of edition which is stored on the viewing and editing information storing section, the viewing and changing permitting section may give permission to change the contents of the file data based on an editing instruction, among the editing instructions obtained by the viewing and editing instruction obtaining section, which is included in the permitted type of edition received by the second communicating section, and the viewing and changing prohibiting section may prohibit changing the contents of the file data based on an editing instruction, among the editing instructions obtained by the viewing and editing instruction obtaining section, which is not included in the permitted type of edition received by the second communicating section.

The display apparatus may further include a user identifying information storing section that stores thereon user identifying information identifying the user, the information processing apparatus may further include a user identifying information obtaining section that obtains user identifying information input by the user and a user judging section that judges whether the user identifying information obtained by the user identifying information obtaining section is the same as the user identifying information stored on the user identifying information storing section, the first communicating section may transmit the user identifying information stored on the user identifying information storing section and the permitted type of edition stored on the viewing and editing information storing section, the second communicating section may receive the user identifying information stored on the user identifying information storing section and the permitted type of edition stored on the viewing and editing information storing section, the user judging section may judge whether the user identifying information obtained by the user identifying information obtaining section is the same as the user identifying information received by the second communicating section, when the user judging section judges positively, the viewing and changing permitting section may give permission to change the contents of the file data based on an editing instruction, among the editing instructions obtained by the viewing and editing instruction obtaining section, which is included in the permitted type of edition received by the second communicating section and is permitted to the user, and when the user judging section judges negatively, the viewing and changing prohibiting section may prohibit changing the contents of the file data.

The user identifying information storing section may store thereon a plurality of pieces of user identifying information respectively identifying a plurality of users, the viewing and editing information storing section may store thereon, as the viewing and editing information, the type of edition which is permitted to be performed on the file data identified by the file identifier stored on the file identifier storing section, in association with each of the plurality of pieces of user identifying information stored on the user identifying information storing section, the first communicating section may transmit the plurality of pieces of user identifying information stored on the user identifying information storing section, and the permitted type of edition stored on the viewing and editing information storing section in association with each of the plurality of pieces of user identifying information, the second communicating section may receive the plurality of pieces of user identifying information stored on the user identifying information storing section, and the permitted type of edition stored on the viewing and editing information storing section in association with each of the plurality of pieces of user identifying information, the user judging section may judge which one of the plurality of pieces of user identifying information received by the second communicating section is the same as the user identifying information obtained by the user identifying information obtaining section, and when the user judging section judges that one of the plurality of pieces of user identifying information is the same as the user identifying information obtained by the user identifying information obtaining section, the viewing and changing permitting section may give permission to change the contents of the file data based on an editing instruction, among the editing instructions obtained by the viewing and editing instruction obtaining section, which is (i) included in the permitted type of edition received by the second communicating section and associated with the piece of user identifying information judged to be the same as the user identifying information obtained by the user identifying information obtaining section and (ii) is permitted to the user.

The information processing apparatus may further include a viewing and editing control section that, when the viewing and changing permitting section gives permission to change the contents of the file data, changes the contents of the file data based on the editing instructions obtained by the viewing and editing instruction obtaining section and a second communication control section that, when the contents of the file data are changed by the viewing and editing control section, causes the second communicating section to transmit the changed contents of the file data to the first communicating section, and the display apparatus may further include a first display control section that updates the file data displayed on the first display section with the changed contents of the file data received by the first communicating section.

The viewing and editing information storing section may store thereon, as the viewing and editing information, an editing-permitted portion, of the file data identified by the file identifier stored on the file identifier storing section, whose contents are permitted to be changed, the first communicating section may transmit, as the viewing and editing information, the editing-permitted portion stored on the viewing and editing information storing section, the second communicating section may receive, as the viewing and editing information, the editing-permitted portion stored on the viewing and editing information storing section, the viewing and changing permitting section may give permission to change the contents of the file data in the editing-permitted portion received by the second communicating section based on the editing instructions obtained by the viewing and editing instruction obtaining section, and the viewing and changing prohibiting section may prohibit changing the contents of the file data in a portion other than the editing-permitted portion received by the second communicating section based on the editing instructions obtained by the viewing and editing instruction obtaining section.

The display system may further include power feeding apparatus that feeds power to the display apparatus by generating a magnetic field within a predetermined range. Here, the display apparatus may further include a power receiving section that receives the power from the magnetic field generated by the power feeding apparatus, and when the display apparatus is placed within the predetermined range so that the power receiving section receives the power, the first communicating section may use the received power to transmit, to the information processing apparatus, the file identifier stored on the file identifier storing section and the viewing and editing information stored on the viewing and editing information storing section.

The viewing and editing information storing section may store thereon, as the viewing and editing information, a viewing-permitted portion, of the file data identified by the file identifier stored on the file identifier storing section, whose contents are permitted to be viewed, the first communicating section may transmit, as the viewing and editing information, the viewing-permitted portion stored on the viewing and editing information storing section, the second communicating section may receive, as the viewing and editing information, the viewing-permitted portion stored on the viewing and editing information storing section, the viewing and changing permitting section may give permission to view the contents of the file data in the viewing-permitted portion received by the second communicating section based on the viewing instructions obtained by the viewing and editing instruction obtaining section, and the viewing and changing prohibiting section may prohibit viewing the contents of the file data in a portion other than the viewing-permitted portion received by the second communicating section based on the viewing instructions obtained by the viewing and editing instruction obtaining section.

The information processing apparatus may further include a viewing and editing control section that extracts, from the file data, the viewing-permitted portion whose contents are permitted to be viewed by the viewing and changing permitting section, and the second communicating section may transmit the viewing-permitted portion extracted by the viewing and editing control section to the display apparatus, so as to cause the first display section to display thereon the extracted viewing-permitted portion.

The viewing and editing information storing section may store thereon, as the viewing and editing information, a permitted number of times of viewing at which the file data identified by the file identifier stored on the file identifier storing section is permitted to be viewed, the first communicating section may transmit, as the viewing and editing information, the permitted number of times of viewing stored on the viewing and editing information storing section, the second communicating section may receive, as the viewing and editing information, the permitted number of times of viewing stored on the viewing and editing information storing section, and the viewing and changing permitting section may give permission to view the contents of the file data in accordance with the permitted number of times of viewing which is received by the second communicating section, or the viewing and changing prohibiting section may prohibit viewing the contents of the file data in accordance with the permitted number of times of viewing which is received by the second communicating section.

The viewing and editing information storing section may store thereon, as the viewing and editing information, a viewing permission expiry limit by which the file data identified by the file identifier stored on the file identifier storing section is permitted to be viewed, the first communicating section may transmit, as the viewing and editing information, the viewing permission expiry limit stored on the viewing and editing information storing section, the second communicating section may receive, as the viewing and editing information, the viewing permission expiry limit stored on the viewing and editing information storing section, and the viewing and changing permitting section may give permission to view the contents of the file data in accordance with the viewing permission expiry limit which is received by the second communicating section, or the viewing and changing prohibiting section may prohibit viewing the contents of the file data in accordance with the viewing permission expiry limit which is received by the second communicating section.

The display apparatus may further include an apparatus identifier storing section that stores thereon an apparatus identifier identifying the display apparatus, the information processing apparatus may further include a display capability storing section that stores thereon a display capability of the display apparatus in association with the apparatus identifier identifying the display apparatus, the first communicating section may further transmit the apparatus identifier stored on the apparatus identifier storing section to the information processing apparatus, the second communicating section may further receive the apparatus identifier stored on the apparatus identifier storing section, and the viewing and changing permitting section may give permission to change the contents of the file data within the display capability which is stored on the display capability storing section in association with the apparatus identifier received by the second communicating section.

According to a second aspect related to the innovations herein, one exemplary method may include a display control method for use in a display system including therein a display apparatus that displays thereon file data, and an information processing apparatus that enables a user to view or edit the file data displayed on the display apparatus. The display control method includes storing a file identifier identifying the file data, storing viewing and editing information which indicates a type of viewing or editing which is permitted to be performed on the file data identified by the file identifier stored in the file identifier storing, displaying the file data, on the display apparatus, identified by the file identifier stored in the file identifier storing, transmitting, to the information processing apparatus, the file identifier stored in the file identifier storing and the viewing and editing information stored in the viewing and editing information storing, receiving the file identifier stored in the file identifier storing and the viewing and editing information stored in the viewing and editing information storing, obtaining the file data identified by the file identifier received in the receiving, obtaining one or more instructions issued by the user to view or edit the file data, referring to the viewing and editing information received in the receiving, and when the file data obtained in the file data obtaining is permitted to be viewed or edited, giving permission to view or change contents of the file data based on the viewing or editing instructions obtained in the viewing and editing instruction obtaining, and referring to the viewing and editing information received in the receiving, and, when the file data obtained in the file data obtaining is not permitted to be viewed or edited, prohibiting viewing or changing the contents of the file data.

According to a third aspect related to the innovations herein, one exemplary program may include a display program for use in a display system including a display apparatus that displays thereon file data, and an information processing apparatus that enables a user to view or edit the file data displayed on the display apparatus. Here, the display program causes the display apparatus to function as a file identifier storing section that stores thereon a file identifier identifying the file data, a viewing and editing information storing section that stores thereon viewing and editing information which indicates a type of viewing or editing which is permitted to be performed on the file data identified by the file identifier stored on the file identifier storing section, a first display section that displays thereon the file data identified by the file identifier stored on the file identifier storing section, and a first communicating section that transmits, to the information processing apparatus, the file identifier stored on the file identifier storing section and the viewing and editing information stored on the viewing and editing information storing section. The display program also causes the information processing apparatus to function as a second communicating section that receives the file identifier stored on the file identifier storing section and the viewing and editing information stored on the viewing and editing information storing section, a file data obtaining section that obtains the file data identified by the file identifier received by the second communicating section, a viewing and editing instruction obtaining section that obtains one or more instructions issued by the user to view or edit the file data, a viewing and changing permitting section that refers to the viewing and editing information received by the second communicating section, and when the file data obtained by the file data obtaining section is permitted to be viewed or edited, gives permission to view or change contents of the file data based on the viewing or editing instructions obtained by the viewing and editing instruction obtaining section, and a viewing and changing prohibiting section that refers to the viewing and editing information received by the second communicating section, and, when the file data obtained by the file data obtaining section is not permitted to be viewed or edited, prohibits viewing or changing the contents of the file data.

According to a fourth aspect related to the innovations herein, one exemplary apparatus may include a display apparatus for displaying thereon file data which is viewed or edited by an external information processing apparatus. The display apparatus includes a file identifier storing section that stores thereon a file identifier identifying the file data, a file data communicating section that transmits the file identifier stored on the file identifier storing section to the information processing apparatus, to make a request of the file data identified by the file identifier stored on the file identifier storing section and obtain the file data from the information processing apparatus, a display section that displays thereon the file data obtained by the file data communicating section, a viewing and editing information storing section that stores thereon viewing and editing information indicating a type of viewing or editing which is permitted to be performed, by the information processing apparatus, on the file data identified by the file identifier stored on the file identifier storing section, and a viewing and editing information communicating section that transmits the viewing and editing information stored on the viewing and editing information storing section to the information processing apparatus, to restrict the viewing or editing which is performed, by the information processing apparatus, on the file data identified by the file identifier stored on the file identifier storing section.

According to a fifth aspect related to the innovations herein, one exemplary method may include a display method for displaying file data which is viewed or edited by an external information processing apparatus. The display method includes storing a file identifier identifying the file data onto a file identifier storing section, transmitting the file identifier stored on the file identifier storing section to the information processing apparatus, to make a request of the file data identified by the file identifier stored on the file identifier storing section and obtain the file data from the information processing apparatus, displaying, on a display section, the file data obtained in the file identifier transmitting, storing, onto a viewing and editing information storing section, viewing and editing information indicating a type of viewing or editing which is permitted to be performed, by the information processing apparatus, on the file data identified by the file identifier stored on the file identifier storing section, and transmitting the viewing and editing information stored on the viewing and editing information storing section to the information processing apparatus, to restrict the viewing or editing which is performed, by the information processing apparatus, on the file data identified by the file identifier stored on the file identifier storing section.

According to a sixth aspect related to the innovations herein, one exemplary program may include a display program for use in a display apparatus for displaying thereon file data which is viewed or edited by an external information processing apparatus. The display program causes the display apparatus to function as a file identifier storing section that stores thereon a file identifier identifying the file data, a file data communicating section that transmits the file identifier stored on the file identifier storing section to the information processing apparatus, to make a request of the file data identified by the file identifier stored on the file identifier storing section and obtain the file data from the information processing apparatus, a display section that displays thereon the file data obtained by the file data communicating section, a viewing and editing information storing section that stores thereon viewing and editing information indicating a type of viewing or editing which is permitted to be performed, by the information processing apparatus, on the file data identified by the file identifier stored on the file identifier storing section, and a viewing and editing information communicating section that transmits the viewing and editing information stored on the viewing and editing information storing section to the information processing apparatus, to restrict the viewing or editing which is performed, by the information processing apparatus, on the file data identified by the file identifier stored on the file identifier storing section.

According to a seventh aspect related to the innovations herein, one exemplary system may include a display system including a display apparatus that displays thereon file data, an information processing apparatus that enables a user to view or edit the file data displayed on the display apparatus and a viewing and editing information storing section that stores thereon, in association with a file identifier identifying the file data, viewing and editing information indicating a type of viewing or editing which is permitted to be performed on the file data. The display apparatus includes a file identifier storing section that stores thereon the file identifier, a first display section that displays thereon the file data identified by the file identifier stored on the file identifier storing section, and a first communicating section that transmits, to the information processing apparatus, the file identifier stored on the file identifier storing section. The information processing apparatus includes a second communicating section that receives the file identifier stored on the file identifier storing section, a file data obtaining section that obtains the file data identified by the file identifier received by the second communicating section, a viewing and editing instruction obtaining section that obtains an instruction issued by the user to view or edit the file data, a viewing and changing permitting section that refers to the viewing and editing information stored on the viewing and editing information storing section, and when the file data obtained by the file data obtaining section is permitted to be viewed or edited, gives permission to view or change contents of the file data based on the viewing or editing instruction obtained by the viewing and editing instruction obtaining section, and a viewing and changing prohibiting section that refers to the viewing and editing information stored on the viewing and editing information storing section, and, when the file data obtained by the file data obtaining section is not permitted to be viewed or edited, prohibits viewing or changing the contents of the file data.

According to an eighth aspect related to the innovations herein, one exemplary program may include a display program for use in a display system including a display apparatus that displays thereon file data, an information processing apparatus that enables a user to view or edit the file data displayed on the display apparatus, and a viewing and editing information storing section that stores thereon, in association with a file identifier identifying the file data, viewing and editing information indicating a type of viewing or editing which is permitted to be performed on the file data. The display program causes the display apparatus to function as a file identifier storing section that stores thereon the file identifier, a first display section that displays thereon the file data identified by the file identifier stored on the file identifier storing section, and a first communicating section that transmits, to the information processing apparatus, the file identifier stored on the file identifier storing section. The display program also causes the information processing apparatus to function as a second communicating section that receives the file identifier stored on the file identifier storing section, a file data obtaining section that obtains the file data identified by the file identifier received by the second communicating section, a viewing and editing instruction obtaining section that obtains an instruction issued by the user to view or edit the file data, a viewing and changing permitting section that refers to the viewing and editing information stored on the viewing and editing information storing section, and when the file data obtained by the file data obtaining section is permitted to be viewed or edited, gives permission to view or change contents of the file data based on the viewing or editing instruction obtained by the viewing and editing instruction obtaining section, and a viewing and changing prohibiting section that refers to the viewing and editing information received by the second communicating section, and, when the file data obtained by the file data obtaining section is not permitted to be viewed or edited, prohibits viewing or changing the contents of the file data.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 4 illustrates the data structure of a storing unit 230.

FIG. 5 illustrates the data structure of the storing unit 230.

FIG. 6 illustrates the data structure of a display capability storing section 336.

DESCRIPTION OF EXEMPLARY EMBODIMENTS

Hereinafter, one aspect of the present invention will be described through some embodiments. The embodiments do not limit the invention according to the claims, and all the combinations of the features described in the embodiments are not necessarily essential to means provided by aspects of the invention.

Figure 1:
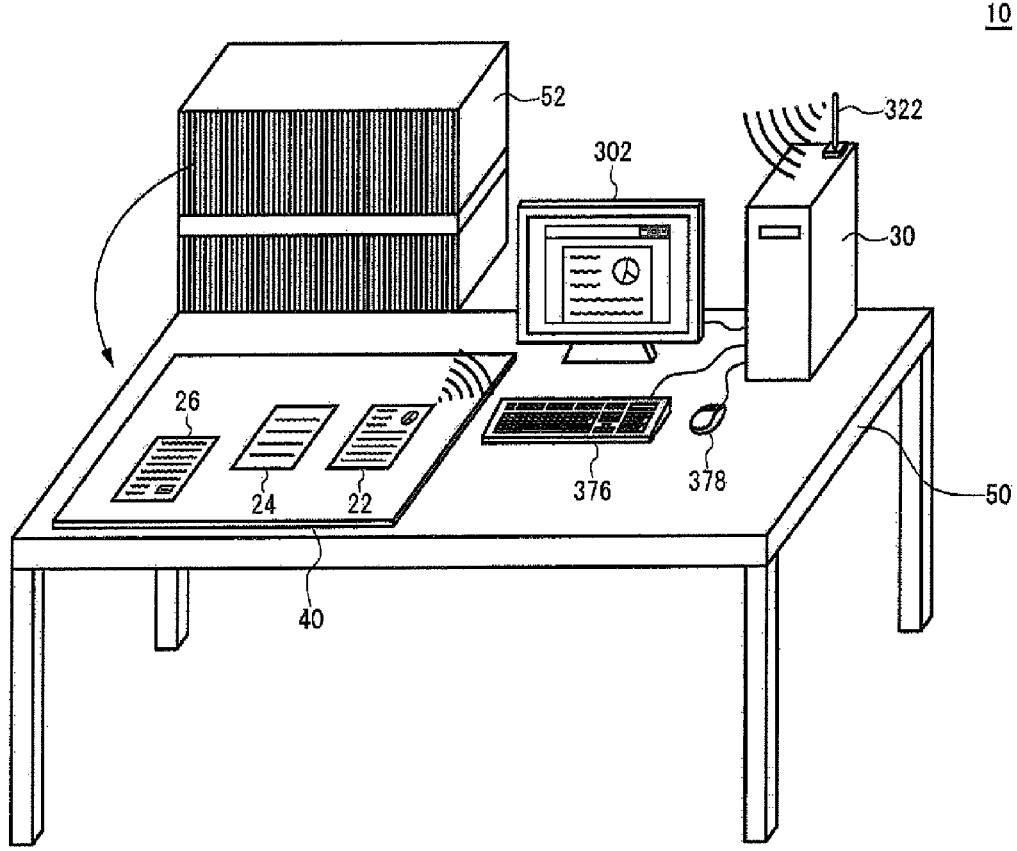
FIG. 1 is a schematic view illustrating a display system 10.

FIG. 1 is a schematic view illustrating a display system 10 relating to one embodiment of the present invention. The display system 10 includes therein display apparatuses 22, 24 and 26, an information processing apparatus 30, and a power feeding apparatus 40. Here, the display system 10 requires at least one display apparatus. The information processing apparatus 30 includes therein a monitor 302 which displays file data thereon, and a keyboard 376 and a mouse 378 which are used to change the contents of the file data by inputting the changes to be made to the file data. Here, the display apparatuses 22, 24 and 26 are, for example, sheets of electronic paper, flexible displays, sheets of rewritable paper, paper-like displays, sheets of digital paper, sheets of electronic paper, electronic sheets, or electronic display sheets.

According to the display system 10 relating to the present embodiment, when a display apparatus displaying thereon predetermined file data receives power from the power feeding apparatus 40, the display apparatus transmits to the information processing apparatus 30 information indicating whether it is permitted to view or change the contents of the file data displayed on the display apparatus. The information processing apparatus 30 displays thereon the file data in such a manner that the contents of the file data are permitted to be viewed or changed, or prohibited from being viewed or changed.

The plurality of display apparatuses 22, 24 and 26 for displaying file data thereon are kept, for example, in a book shelf 52. A user takes out the desired display apparatuses 22, 24 and 26 from the book shelf 52, and places the display apparatuses 22, 24 and 26 on the power feeding apparatus 40 that is provided on a table 50. The power feeding apparatus 40 generates a magnetic field within a predetermined range, so as to feed power to each of the display apparatuses 22, 24 and 26.

Note that each of the display apparatuses 22, 24 and 26 stores thereon a file identifier and viewing and editing information. The file identifier identifies the file data displayed on a corresponding one of the display apparatuses 22, 24 and 26. The viewing and editing information indicates whether it is permitted to view or change the contents of the file data via the information processing apparatus 30. When receiving power from the power feeding apparatus 40, each of the display apparatuses 22, 24 and 26 transmits the file identifier and viewing and editing information to the information processing apparatus 30.

The information processing apparatus 30 receives, via an antenna 322, the file identifier and viewing and editing information from each of the display apparatuses 22, 24 and 26. The information processing apparatus 30 refers to the received pieces of viewing and editing information. The information processing apparatus 30 then judges whether it is permitted to view or change the contents of the file data identified by each of the file identifiers received from the display apparatuses 22, 24 and 26. When judging that it is prohibited to view the file data, the information processing apparatus 30 does not display the contents of the file data on the monitor 302. When judging that it is prohibited to change the contents of the file data, the information processing apparatus 30 displays the file data on the monitor 302 in such a manner that the contents of the file data are prohibited from being changed. To be specific, the information processing apparatus 30 prohibits changing the contents of the file data by opening the file data with the use of viewing software which is incapable of changing the contents of the file data. Alternatively, the information processing apparatus 30 may prohibit changing the contents of the file data by opening the file data with the use of word processor software with the function of the word processor software for changing the contents of the file data (for example, the letter input and copy functions) being disabled. On the other hand, when judging that it is permitted to change the contents of the file data, the information processing apparatus 30 displays the file data on the monitor 302 in such a manner that the contents of the file data are permitted to be changed. To be specific, the information processing apparatus 30 gives permission to change the contents of the file data by opening the file data with the use of word processor software or the like which is capable of changing the contents of the file data.

For example, a case is assumed where the viewing and editing information received from the display apparatus 22 indicates that the contents of the file data are permitted to be viewed but prohibited from being changed. In this case, the information processing apparatus 30 opens the corresponding file data by using viewing software so as to prohibit changing the contents of the file data displayed on the display apparatus 22. As another example, a case is assumed where the pieces of viewing and editing information received from the display apparatuses 24 and 26 indicate that the contents of the corresponding pieces of file data are permitted to be changed. In this case, the information processing apparatus 30 opens the corresponding pieces of file data by using word processor software which is capable of changing the contents of the pieces of file data displayed on the display apparatuses 24 and 26.

The information processing apparatus 30 displays file data on the monitor 302. The information processing apparatus 30 displays on the monitor 302 a plurality of pieces of file data respectively identified by file identifiers received from a plurality of display apparatuses. The user changes the contents of desired file data displayed on the monitor 302 by inputting desired information to the desired file data via the keyboard 376 and mouse 378. The information processing apparatus 30 transmits the pieces of file data whose contents are changed by the user, to the display apparatuses 24 and 26 via the antenna 322. The display apparatuses 24 and 26 display thereon the pieces of file data which are received from the information processing apparatus 30 and whose contents have been changed.

Figure 2:
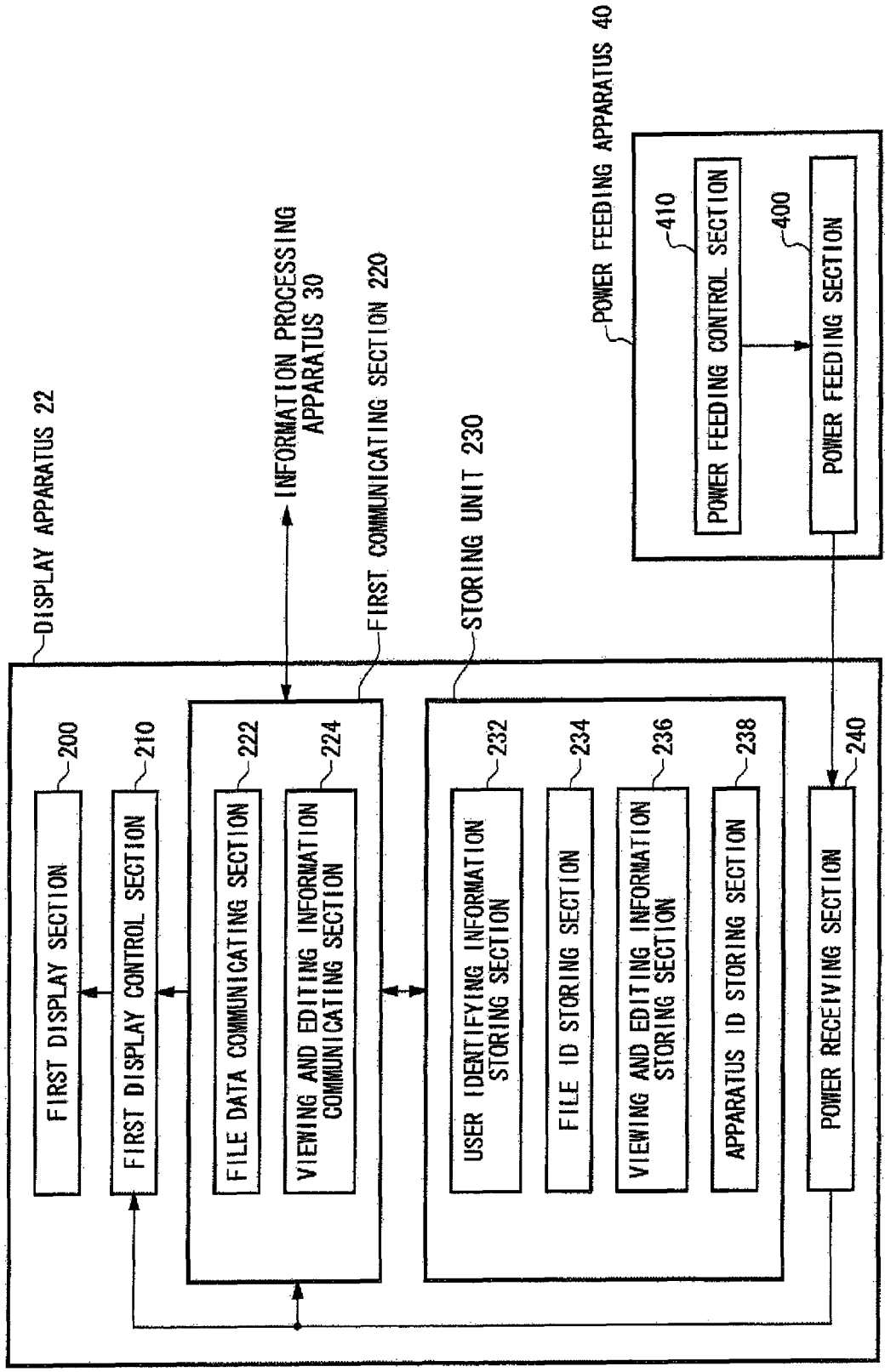
FIG. 2 is a block diagram illustrating the functional configurations of a display apparatus 22 and a power feeding apparatus 40.
Figure 3:
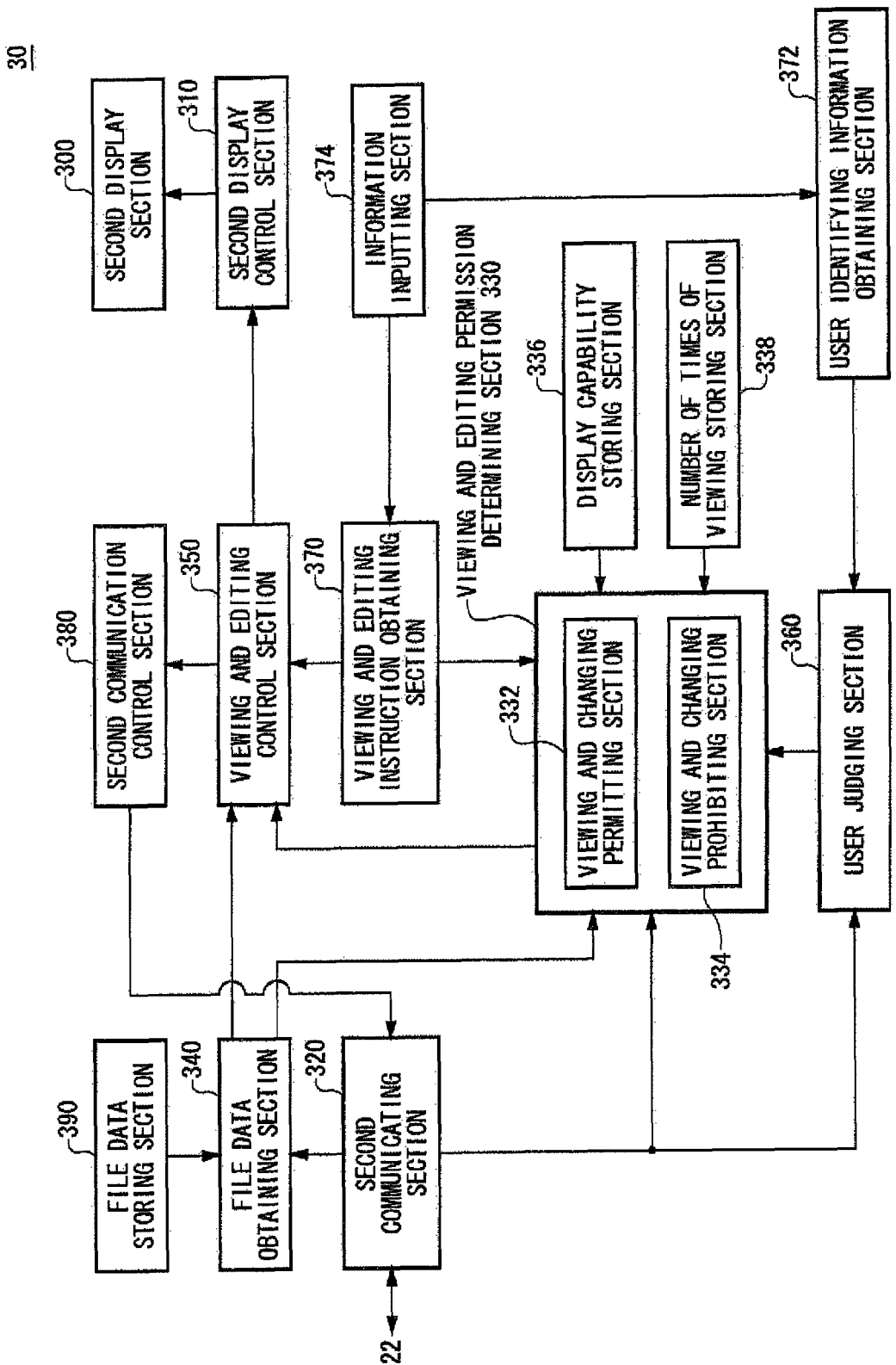
FIG. 3 is a block diagram illustrating the functional configuration of an information processing apparatus 30.

FIG. 2 illustrates exemplary functional configurations of the display apparatus 22 and power feeding apparatus 40 relating to the present embodiment. FIG. 3 illustrates an exemplary functional configuration of the information processing apparatus 30 relating to the present embodiment. The display apparatus 22 includes therein a first display section 200, a first display control section 210, a first communicating section 220, a storing unit 230, and a power receiving section 240. The first communicating section 220 includes therein a file data communicating section 222 and a viewing and editing information communicating section 224. The storing unit 230 includes therein a user identifying information storing section 232, a file identifier storing section 234, a viewing and editing information storing section 236, and an apparatus identifier storing section 238.

The power feeding apparatus 40 includes therein a power feeding section 400 and a power feeding control section 410. The information processing apparatus 30 includes therein a second display section 300, a second display control section 310, a second communicating section 320, a viewing and editing permission determining section 330, a display capability storing section 336, a number of times of viewing storing section 338, a file data obtaining section 340, a viewing and editing control section 350, a user judging section 360, a viewing and editing instruction obtaining section 370, a user identifying information obtaining section 372, an information inputting section 374, a second communication control section 380, and a file data storing section 390. The viewing and editing permission determining section 330 includes therein a viewing and changing permitting section 332 and a viewing and changing prohibiting section 334.

The functional configuration of the power feeding apparatus 40 is described. The power feeding apparatus 40 generates a magnetic field within a predetermined range, so as to feed power to the display apparatus 22. To be more specific, the power feeding section 400 included in the power feeding apparatus 40 generates the magnetic field within the predetermined range. The power feeding section 400 feeds power to the display apparatus 22 without a direct connection with the power receiving section 240 of the display apparatus 22. The power feeding control section 410 controls the power fed from the power feeding section 400 to the power receiving section 240. For example, the power feeding control section 410 controls the amount of power fed from the power feeding section 400 to the power receiving section 240 by varying the state of the magnetic field generated. The power feeding control section 410 may also monitor the state of the magnetic field generated by the power feeding section 400. When the power receiving section 240 becomes present within a predetermined range from the position of the power feeding section 400, the state of the magnetic field generated by the power feeding section 400 varies. Therefore, by detecting a variation in the state of the magnetic field generated by the power feeding section 400, the power feeding control section 410 can judge that the power receiving section 240 is present within the predetermined range from the position of the power receiving section 400.

The functional configuration of the display apparatus 22 is next described. The display apparatus 22 displays thereon file data which is, for example, a document file, an image file or the like. The file data displayed on the display apparatus 22 may be file data edited by means of the information processing apparatus 30 external to the display apparatus 22. To start with, the power receiving section 240 receives power from the magnetic field generated by the power feeding section 400 included in the power feeding apparatus 40. The power receiving section 240 supplies the received power to the first display control section 210 and first communicating section 220. Here, the power receiving section 240 may include therein an antenna coil. If this is the case, the power receiving section 240 is capable of receiving power in a noncontact manner.

The storing unit 230 stores thereon user identifying information, a file identifier, viewing and editing information and an apparatus identifier. To be specific, these pieces of information are stored in the sections explained in the following. The user identifying information storing section 232 stores thereon user identifying information identifying a user. The user identifying information stored on the user identifying information storing section 232 may be an identifier which can uniquely identify the user, a password, a user ID made up by numbers and the like, or the like. The user identifying information may be information indicating, for example, the fingerprints, veins, or iris of the user. The user identifying information storing section 232 may store thereon a plurality of pieces of user identifying information each identifying a corresponding one of a plurality of users. The file identifier storing section 234 stores thereon a file identifier identifying file data. The file identifier may be, for example, a file name. The file identifier may include information of an URL or the like indicating the location of the file data.

The viewing and editing information storing section 236 stores thereon viewing and editing information indicating a type of viewing or editing which is permitted to be performed on the file data identified by the file identifier stored on the file identifier storing section 234. In other words, the viewing and editing information storing section 236 stores thereon the viewing and editing information indicating the type of viewing or editing which is permitted to be performed, by the information processing apparatus 30, on the file data identified by the file identifier. To be specific, the viewing and editing information storing section 236 stores thereon, as the viewing and editing information, a viewing-permitted portion, in the contents of the file data identified by the file identifier stored on the file identifier storing section 234, which is permitted to be viewed. Also, the viewing and editing information storing section 236 stores thereon, as the viewing and editing information, a type of application software which is capable of changing the contents of the file data (editing-capable software), or a type of application software which is incapable of changing the contents of the file data (editing-incapable software). The editing-capable software may include, for example, word processor software, spreadsheet software, and image editing software. The editing-incapable software may include, for example, viewing software for displaying file data in a predetermined file format and image viewer.

The viewing and editing information storing section 236 may store thereon, as the viewing and editing information, the type of editing-capable or editing-incapable software, in association with each of the pieces of user identifying information stored on the user identifying information storing section 232. The viewing and editing information storing section 236 may store thereon, as the viewing and editing information, a type of edition which is permitted to be performed on the file data identified by the file identifier stored on the file identifier storing section 234. The permitted type of edition may be information indicating that the contents of the file data are permitted to be changed (for example, the contents of the file data can be deleted, and information can be added to the contents of the file data). The permitted type of edition may be information indicating at least one of the following functions relating to the file data including cut, copy, paste, overwrite save, save under a different name, print, and send.

The viewing and editing information storing section 236 may store thereon, as the viewing and editing information, the type of edition which is permitted to be performed on the file data identified by the file identifier stored on the file identifier storing section 234, in association with each of the pieces of user identifying information stored on the user identifying information storing section 232. To be specific, the viewing and editing information storing section 236 stores thereon, in association with each of the user identifiers, the type of edition which is permitted for the user who is identified by the user identifier to perform on the file data. For example, the viewing and editing information storing section 236 stores thereon, in association with a certain user, a permitted type of edition indicating that the contents of the file data are permitted to be changed. On the contrary, the viewing and editing information storing section 236 stores thereon, in association with a different user, a permitted type of edition indicating that the contents of the file data are prohibited from being changed.

The viewing and editing information storing section 236 may store thereon, as the viewing and editing information, a viewing-permitted or editing-permitted portion, in the contents of the file data identified by the file identifier stored on the file identifier storing section 234, which is permitted to be viewed or changed. For example, the viewing and editing information storing section 236 identifies a portion, in predetermined file data, whose contents are prohibited from being viewed or changed, and stores the remaining portion other than the identified portion, as the viewing-permitted or editing-permitted portion whose contents are permitted to be freely viewed or edited.

The viewing and editing information storing section 236 stores thereon, as the viewing and editing information, a permitted number of times of viewing at which the file data is permitted to be viewed, where the file data is identified by the file identifier stored on the file identifier storing section 234. To be specific, the viewing and editing information storing section 236 stores thereon, in association with a user identifier and a file identifier, the number of times at which the file data identified by the file identifier is permitted to be displayed on the first display section 200 of the display apparatus 22. Here, the viewing and editing information storing section 236 may store thereon the number of times at which the file data is permitted to be displayed, further in association with an apparatus identifier.

The viewing and editing information storing section 236 stores thereon, as the viewing and editing information, a viewing permission expiry limit by which the file data is permitted to be viewed, where the file data is identified by the file identifier stored on the file identifier storing section 234. To be specific, the viewing and editing information storing section 236 stores thereon an expiry limit by which the file data identified by the file identifier is permitted to be displayed on the first display section 200 of the display apparatus 22. The viewing and editing information storing section 236 may store thereon an expiry limit by which the file data is permitted to be viewed, in association with a user identifier or apparatus identifier. The apparatus identifier storing section 238 stores thereon an apparatus identifier identifying the display apparatus 22. The storing unit 230 supplies the user identifying information, file identifier, viewing and editing information, and apparatus identifier, to the second communicating section 320, under the control of the first communicating section 220.

The first communicating section 220 extracts the user identifying information stored on the user identifying information storing section 232, the file identifier stored on the file identifier storing section 234, the viewing and editing information stored on the viewing and editing information storing section 236, or the apparatus identifier stored on the apparatus identifier storing section 238, and transmits the extracted information to the information processing apparatus 30. Here, the viewing and editing information may include at least one of: the type of editing-capable software; the type of editing-incapable software; the type of editing-capable or editing-incapable software which is associated with the user identifying information; the permitted type of edition; the permitted type of edition which is associated with the user identifying information; the editing-permitted portion; the viewing-permitted portion; the permitted number of times of viewing; and the viewing permission expiry limit. When the user identifying information storing section 232 stores thereon a plurality of pieces of user identifying information, the first communicating section 220 may transmit the plurality of pieces of user identifying information to the information processing apparatus 30. When the display apparatus 22 is placed within the predetermined range within which the magnetic field is generated by the power feeding apparatus 40 so that the power receiving section 240 receives power, the first communicating section 220 may use the power received by the power receiving section 240 to transmit the user identifying information, file identifier, or viewing and editing information, to the information processing apparatus 30.

By transmitting the file identifier to the information processing apparatus 30, the file data communicating section 222 included in the first communicating section 220 makes a request to the information processing apparatus 30 for the file data identified by the transmitted file identifier. The file, data communicating section 222 thus obtains, from the information processing apparatus 30, the file data identified by the transmitted file identifier.

When the file identifier storing section 234 stores thereon a plurality of different file identifiers, the file data communicating section 222 transmits the plurality of file identifiers to the information processing apparatus 30. In his case, the file data communicating section 222 obtains, from the information processing apparatus 30, the file data identified by one or more of the transmitted file identifiers which are designated by the user via the information inputting section 374 of the information processing apparatus 30.

The viewing and editing information communicating section 224 included in the first communicating section 220 transmits viewing and editing information to the information processing apparatus 30. By transmitting the viewing and editing information to the information processing apparatus 30, the viewing and editing information communicating section 224 imposes restriction on the viewing or editing which is performed by the information processing apparatus 30 on the file data identified by the file identifier. The first communicating section 220 supplies the file data obtained by the file data communicating section 222 from the information processing apparatus 30, to the first display control section 210.

The first display control section 210 causes the first display section 200 to display thereon the file data received from the first communicating section 220. When the first display section 200 already displays thereon predetermined file data, the first display control section 210 may update the predetermined file data currently displayed on the first display section 200 with the contents of the file data received from the first communicating section 220. The first display section 200 displays thereon the file data identified by the file identifier stored on the file identifier storing section 234. To be specific, the first display section 200 displays thereon the file data which is received by the first communicating section 220 from the information processing apparatus 30, under the control of the first display control section 210. Here, it should be noted that the first display section 200 is shown as an example of the display section included in the display apparatus set forth in the appended claims.

The functional configuration of the information processing apparatus 30 shown in FIG. 3 is next described. The information processing apparatus 30 enables the user to edit the file data displayed on the display apparatus 22. The second communicating section 320 receives, from the display apparatus 22, the user identifying information stored on the user identifying information storing section 232, the file identifier stored on the file identifier storing section 234, the viewing and editing information stored on the viewing and editing information storing section 236, or the apparatus identifier stored on the apparatus identifier storing section 238. Here, the second communicating section 320 may include therein the antenna 322. The viewing and editing information received by the second communicating section 320 may include at least one of: the type of editing-capable software; the type of editing-incapable software; the type of editing-capable or editing-incapable software which is associated with the user identifying information; the permitted type of edition; the permitted type of edition which is associated with the user identifying information, the editing-permitted portion; the viewing-permitted portion; the permitted number of times of viewing; and the viewing permission expiry limit. The second communicating section 320 supplies the received user identifying information to the user judging section 360. The second communicating section 320 also supplies the received file identifier to the file data obtaining section 340. The second communicating section 320 also supplies the received viewing and editing information to the viewing and editing permission determining section 330.

The file data storing section 390 stores thereon file data in association with a file identifier. The file data storing section 390 supplies file data to the file data obtaining section 340 under the control of the file data obtaining section 340. The file data obtaining section 340 obtains, from the file data storing section 390, the file data identified by the file identifier received from the second communicating section 320. The file data obtaining section 340 supplies the obtained file data to the viewing and editing control section 350.

When the file identifier storing section 234 stores thereon a plurality of different file identifiers, the second communicating section 320 receives, from the display apparatus 22, the plurality of file identifiers stored on the file identifier storing section 234. The file data obtaining section 340 obtains, from the file data storing section 390, the file data identified by one or more of the file identifiers received from the second communicating section 320 which are designated by the user via the information inputting section 374.

The file data obtaining section 340 supplies, to the viewing and editing permission determining section 330, the file identifier associated with the obtained file data. The information inputting section 374 receives an input of information from the user. The keyboard 376 and mouse 378 are shown as an example of the information inputting section 374. The information inputting section 374 supplies, to the viewing and editing instruction obtaining section 370, an editing instruction issued by the user for the contents of the file data. The information inputting section 374 supplies, to the user identifying information obtaining section 372, user identifying information identifying the user.

The user identifying information obtaining section 372 obtains the user identifying information which is input by the user. To be specific, the user identifying information obtaining section 372 enables the user to input the user identifying information via the information inputting section 374. The user identifying information obtaining section 372 obtains the user identifying information which is input into the information inputting section 374 by the user. The user identifying information may be a user ID that can uniquely identify the user, a password or the like. The user identifying information obtaining section 372 may obtain the user identifying information by means of the biometrics technique. When the user identifying information obtaining section 372 uses the biometrics technique, the user identifying information may be information indicating, for example, the user's fingerprints or veins of the fingers. The user identifying information obtaining section 372 supplies the obtained user identifying information to the user judging section 360.

The user judging section 360 judges whether the user identifying information received from the second communicating section 320 is the same as the user identifying information received from the user identifying information obtaining section 372. When receiving a plurality of pieces of user identifying information from the second communicating section 320, the user judging section 360 judges whether which one of the pieces of user identifying information received from the second communicating section 320 is the same as the user identifying information received from the user identifying information obtaining section 372. The user judging section 360 supplies the result of the judgment to the viewing and editing permission determining section 330. The viewing and editing instruction obtaining section 370 obtains a viewing or editing instruction issued by the user for the file data, via the information inputting section 374. The viewing and editing instruction obtaining section 370 supplies the editing instruction to the viewing and editing control section 350.

The number of times of viewing storing section 338 stores thereon the number of times at which the user views the file data by using the display apparatus 22. To be more specific, the number of times of viewing storing section 338 stores thereon, in association with the file identifier and user identifying information transmitted from the first communicating section 220, the number of times at which the viewing and changing permitting section 332 gives permission to view the file data, as the number of times of viewing. Each time the viewing and changing permitting section 332 gives permission to view the file data, the number of times of viewing storing section 338 increments the number of times of viewing by one and stores the incremented number in association with the file identifier and user identifying information. Here, the number of times of viewing storing section 338 may store thereon the number of times of viewing further in association with the apparatus identifier.

The display capability storing section 336 stores thereon the display capability of the display apparatus 22, in association with the apparatus identifier identifying the display apparatus 22. To be specific, the display capability storing section 336 stores thereon the respective display capabilities of a plurality of display apparatuses 22, in association with the apparatus identifiers respectively identifying the plurality of display apparatuses 22. The display capability storing section 336 may be alternatively included in the display apparatus 22.

If this is the case, the display capability storing section stores thereon its own display capability in association with the apparatus identifier. The first communicating section 220 transmits, to the information processing apparatus 30, the apparatus identifier and display capability which are stored on the display capability storing section.

The viewing and editing permission determining section 330 determines whether it is permitted to view or change the contents of the file data identified by the file identifier obtained by the file data obtaining section 340, with reference to the viewing and editing information received from the second communicating section 320. To be specific, the viewing and changing permitting section 332 of the viewing and editing permission determining section 330 refers to the viewing and editing information received from the second communicating section 320. When it is permitted to view or edit the file data obtained by the file data obtaining section 340, the viewing and changing permitting section 332 gives permission to view or change the contents of the file data based on the viewing or editing instruction obtained by the viewing and editing instruction obtaining section 370. To be specific, the viewing and changing permitting section 332 gives permission to view or change the contents of the file data by using the type of editing-capable software included in the viewing and editing information in order to open the file data obtained by the file data obtaining section 340. For example, the viewing and changing permitting section 332 instructs the viewing and editing control section 350 to open the file data obtained by the file data obtaining section 340 with the use of the type of editing-capable software included in the viewing and editing information.

The viewing and changing permitting section 332 gives permission to view the viewing-permitted portion in the contents of the file data in accordance with the viewing instruction obtained by the viewing and editing instruction obtaining section 370, where the viewing-permitted portion is received by the second communicating section 320. To be specific, the viewing and changing permitting section 332 of the viewing and editing permission determining section 330 refers to the viewing and editing information received from the second communicating section 320. When the viewing-permitted portion is defined for the file data obtained by the file data obtaining section 340, the viewing and changing permitting section 332 gives permission to view the viewing-permitted portion in the contents of the file data in accordance with the viewing instruction obtained by the viewing and editing instruction obtaining section 370. The viewing and changing permitting section 332 instructs the viewing and editing control section 350 to extract the viewing-permitted portion from the file data obtained by the file data obtaining section 340.

When the result of the judgment received from the user judging section 360 indicates that the user identifying information obtained by the second communicating section 320 is the same as the user identifying information obtained by the user identifying information obtaining section 372, the viewing and changing permitting section 332 may open the file data obtained by the file data obtaining section 340. For example, when the result of the judgment received from the user judging section 360 indicates that the user identifying information obtained by the second communicating section 320 is the same as the user identifying information obtained by the user identifying information obtaining section 372, the viewing and changing permitting section 332 may open the file data obtained by the file data obtaining section 340 with the use of the type of editing-capable software received from the second communicating section 320. In this way, the viewing and changing permitting section 332 can give permission to view or change the contents of the file data.

When the second communicating section 320 receives a plurality of pieces of user identifying information, the viewing and changing permitting section 332 may open the file data obtained by the file data obtaining section 340 with reference to the viewing and editing information which is associated with the user identifying information which is judged by the user judging section 360 to be the same as the user identifying information obtained by the user identifying information obtaining section 372. For example, when the second communicating section 320 receives a plurality of pieces of user identifying information, the viewing and changing permitting section 332 may open the file data obtained by the file data obtaining section 340, with the use of the type of editing-capable software which is associated with the user identifying information which is judged by the user judging section 360 to be the same as the user identifying information obtained by the user identifying information obtaining section 372. In this way, the viewing and changing permitting section 332 can determine whether it is permitted or prohibited to view or change the contents of the file data, in association with each user.

The viewing and changing permitting section 332 gives permission to change the contents of the file data in accordance with an editing instruction, among editing instructions obtained by the viewing and editing instruction obtaining section 370, which is included in the permitted type of edition received from the second communicating section 320. To be specific, when the permitted type of edition includes permission to change the contents of the file data, permission to copy the file data, and permission to print out the file data, the viewing and changing permitting section 332 gives permission to change the contents of the file data, copy the file data, and print out the file data. When receiving information from the user judging section 360 indicating that the compared pieces of user identifying information are the same, the viewing and changing permitting section 332 gives permission only to the editing instructions included in the permitted type of edition that is associated with the user identifying information.

For example, when the user identified by the user identifying information is permitted only to change the contents of the file data, the viewing and changing permitting section 332 gives permission only to change the contents of the file data, among the editing instructions issued by the user and obtained by the viewing and editing instruction obtaining section 370. Which is to say, the viewing and changing permitting section 332 does not give permission to copy or save the contents of the file data, or transmit the file data to a different information processing apparatus. When the second communicating section 320 obtains a plurality of pieces of user identifying information, the viewing and changing permitting section 332 gives permission only to the permitted type of edition which is permitted to the user identified by the user identifying information that is judged by the user judging section 360 to be the same.

The viewing and changing permitting section 332 gives permission to change the contents of the file data within the display capability stored on the display capability storing section 336 in association with the apparatus identifier received by the second communicating section 320. To be specific, the viewing and changing permitting section 332 refers to the display capability storing section 336. The viewing and changing permitting section 332 obtains the display capability of the display apparatus 22 with reference to the apparatus identifier received by the second communicating section 320. The viewing and changing permitting section 332 gives permission, to the viewing and editing control section 350, to change the contents of the file data within the obtained display capability of the display apparatus 22. For example, the viewing and changing permitting section 332 gives permission to change the contents of the file data within the resolution, available colors, or screen size of the display apparatus 22.

The viewing and changing permitting section 332 gives permission to view the contents of the file data in accordance with the permitted number of times of viewing which is received from the second communicating section 320. To be specific, the viewing and changing permitting section 332 obtains, from the number of times of viewing storing section 338, the number of times of viewing which is associated with the user identifying information and file identifier received by the second communicating section 320. Also, the viewing and changing permitting section 332 obtains the permitted number of times of viewing from the viewing and editing information that is received by the second communicating section 320. When the number of times of viewing associated with the user identifying information and file identifier does not exceed the obtained permitted number of times of viewing, the viewing and changing permitting section 332 gives permission to view the file data to the viewing and editing control section 350. Furthermore, when the number of times of viewing associated with the apparatus identifier does not exceed the obtained permitted number of times of viewing either, the viewing and changing permitting section 332 may give permission to view the file data to the viewing and editing control section 350.

The viewing and changing permitting section 332 gives permission to view the contents of the file data in accordance with the viewing permission expiry limit which is received by the second communicating section 320. To be specific, the viewing and changing permitting section 332 compares the viewing permission expiry limit which is received by the second communicating section 320 with the current date and time. When the current date and time is within the viewing permission expiry limit, the viewing and changing permitting section 332 gives permission to view the file data to the viewing and editing control section 350.

The viewing and changing prohibiting section 334 refers to the viewing and editing information received from the second communicating section 320. When it is not permitted to view or edit the file data obtained by the file data obtaining section 340, the viewing and changing prohibiting section 334 prohibits viewing or changing the contents of the file data based on the viewing or editing instruction obtained by the viewing and editing instruction obtaining section 370. To be specific, the viewing and changing prohibiting section 334 prohibits viewing or changing the contents of the file data obtained by the file data obtaining section 340, by opening the file data with the use of the type of editing-incapable software included in the viewing and editing information. For example, the viewing and changing prohibiting section 334 instructs the viewing and editing control section 350 to open the file data obtained by the file data obtaining section 340 with the use of the type of editing-incapable software included in the viewing and editing information. Since it is defined in advance in the editing-incapable software that the contents of the file data are not permitted to be changed, the viewing and changing prohibiting section 334 can prohibit changing the contents of the file data by opening the file data with the use of the editing-incapable software.

The viewing and changing prohibiting section 334 prohibits viewing the contents of the file data, except for the viewing-permitted portion received by the second communicating section, based on the viewing instruction obtained by the viewing and editing instruction obtaining section 370. To be specific, the viewing and changing prohibiting section 334 refers to the viewing and editing information received from the second communicating section 320. When the viewing-permitted portion is defined in the file data obtained by the file data obtaining section 340, the viewing and changing prohibiting section 334 prohibits viewing the contents of the file data, except for the viewing-permitted portion, based on the viewing instruction obtained by the viewing and editing instruction obtaining section 370. Which is to say, the viewing and changing prohibiting section 334 instructs the viewing and editing control section 350 to extract a portion other than the viewing-permitted portion from the file data obtained by the file data obtaining section 340. Here, one of the viewing and changing permitting and prohibiting sections 332 and 334 may issue, to the viewing and editing control section 350, a corresponding one of the instruction to extract the viewing-permitted portion and the instruction to extract the portion other than the viewing-permitted portion.

When the result of the judgment received from the user judging section 360 indicates that the user identifying information obtained by the second communicating section 320 is not the same as the user identifying information obtained by the user identifying information obtaining section 372, the viewing and changing prohibiting section 334 may open the file data obtained by the file data obtaining section 340 with the use of the type of editing-incapable software received from the second communicating section 320. In this way, the viewing and changing prohibiting section 334 can prohibit changing the contents of the file data. Alternatively, the viewing and changing prohibiting section 334 may prohibit changing the contents of the file data by not opening the file data.

The viewing and changing prohibiting section 334 prohibits changing the contents of the file data based on an editing instruction, among the editing instructions obtained by the viewing and editing instruction obtaining section 370, which is not included in the permitted type of edition received from the second communicating section 320. To be specific, when the permitted type of edition includes permission to change the contents of the file data and permission to copy the file data, the viewing and changing prohibiting section 334 prohibits other types of edition than changing the contents of the file data and copying the file data. For example, the viewing and changing prohibiting section 334 prohibits printing and transmitting the file data. When receiving from the user judging section 360 information indicating that the compared pieces of user identifying information are not the same, the viewing and changing prohibiting section 334 prohibits viewing or changing the contents of the file data. The viewing and editing permission determining section 330 supplies, to the viewing and editing control section 350, the permission issued by the viewing and changing permitting section 332 and the prohibition imposed by the viewing and changing prohibiting section 334.

In place of the viewing and changing permitting section 332, the viewing and changing prohibiting section 334 may prohibit viewing the contents of the file data in accordance with the permitted number of times of viewing which is received by the second communicating section 320. To be specific, the viewing and changing prohibiting section 334 obtains, from the number of times of viewing storing section 338, the number of times of viewing which is associated with the user identifying information and file identifier which are received by the second communicating section 320. Also, the viewing and changing prohibiting section 334 obtains the permitted number of times of viewing from the viewing and editing information which is received by the second communicating section 320. When the number of times of viewing which is associated with the user identifier and file identifier exceeds the obtained permitted number of times of viewing, the viewing and changing prohibiting section 334 prohibits the viewing and editing control section 350 from viewing the file data. Furthermore, when the number of times of viewing which is associated with the apparatus identifier also exceeds the obtained permitted number of times of viewing, the viewing and changing prohibiting section 334 may prohibit the viewing and editing control section 350 from viewing the file data.

In place of the viewing and changing permitting section 332, the viewing and changing prohibiting section 334 may prohibit viewing the contents of the file data in accordance with the viewing permission expiry limit which is received by the second communicating section 320. To be specific, the viewing and changing prohibiting section 334 compares the viewing permission expiry limit which is received by the second communicating section 320 with the current date and time. When the current date and time exceeds the viewing permission expiry limit, the viewing and changing prohibiting section 334 may prohibit the viewing and editing control section 350 from viewing the file data.

The viewing and editing control section 350 changes the contents of the file data based on the editing instructions obtained by the viewing and editing instruction obtaining section 370, when the viewing and changing permitting section 332 gives permission to change the contents of the file data. To be specific, among the editing instructions received from the viewing and editing instruction obtaining section 370, the viewing and editing control section 350 performs a type of edition which is permitted by the viewing and changing permitting section 332, on the file data received from the file data obtaining section 340. The viewing and editing control section 350 supplies the changed file data to the second display control section 310 and second communication control section 380. When having received, from the viewing and changing prohibiting section 334, information indicating that the contents of the file data are prohibited from being changed, the viewing and editing control section 350 prohibits changing the contents of the file data based on the editing instruction received from the viewing and editing instruction obtaining section 370. In this case, the viewing and editing control section 350 does not change the contents of the file data, and supplies the unchanged file data to the second display control section 310.

The viewing and editing control section 350 performs a type of edition which is permitted by the viewing and changing permitting section 332 within the display capability of the display apparatus 22. To be specific, when the editing instruction obtained from the viewing and editing instruction obtaining section 370 is within the display capability of the display apparatus 22, the viewing and editing control section 350 edits the file data based on the editing instruction. When the editing instruction obtained is not within the display capability of the display apparatus 22, the viewing and editing control section 350 does not edit the file data based on the editing instruction. The viewing and editing control section 350 supplies the edited or non-edited file data to the second communicating section 320 and second display control section 310. The second communicating section 320 transmits, to the display apparatus 22, the viewing-permitted portion extracted by the viewing and editing control section 350, so as to cause the first display section 200 to display thereon the viewing-permitted portion.

When the editing instruction is beyond the display capability of the display apparatus 22, the viewing and editing control section 350 may cause the second display section 300 to display thereon a warning via the second display control section 310. The viewing and editing control section 350 may instruct the second display control section 310 to realize display in accordance with the display capability of the display apparatus 22. To be specific, the viewing and editing control section 350 may instruct the second display control section 310 to perform appropriate control to display the file data within the display capability of the display apparatus 22. The viewing and editing control section 350 may open the file data in such a manner that the file data can not be edited beyond the display capability of the display apparatus 22. For example, the viewing and editing control section 350 may open the file data in such a manner that an editing instruction button of the editing software which can perform edition beyond the display capability of the display apparatus 22 can not be selected.

The viewing and editing control section 350 extracts, from the file data, the viewing-permitted portion which is permitted to be viewed by the viewing and changing permitting section 332. To be specific, the viewing and editing control section 350 extracts, from the contents of the file data received from the file data obtaining section 340, the viewing-permitted portion which is designated by the viewing and changing permitting section 332. The viewing and editing control section 350 supplies the file data to the second display control section 310, and supplies the viewing-permitted portion extracted from the file data to the second communication control section 380. The second communication control section 380 supplies the viewing-permitted portion extracted by the viewing and editing control section 350 to the second communicating section 320. The second communicating section 320 transmits the viewing-permitted portion extracted by the viewing and editing control section 350 to the display apparatus 22, so as to cause the first display section 200 to display thereon the extracted viewing-permitted portion.

The viewing and editing control section 350 extracts, from the file data, the portion other than the viewing-permitted portion which is prohibited from being viewed by the viewing and changing prohibiting section 334. To be specific, the viewing and editing control section 350 extracts, from the contents of the file data received from the file data obtaining section 340, the viewing-permitted portion which is designated by the viewing and changing prohibiting section 334. The viewing and editing control section 350 supplies the file data to the second display control section 310, and supplies, to the second communication control section 380, the viewing-permitted portion which is extracted from the file data. The second communication control section 380 supplies the viewing-permitted portion extracted by the viewing and editing control section 350 to the second communicating section 320. The second communicating section 320 transmits to the display apparatus 22 the viewing-permitted portion extracted by the viewing and editing control section 350, so as to cause the first display section 200 to display thereon the viewing-permitted portion.

Here, the viewing and editing control section 350 may receive one of the instruction to extract the viewing-permitted portion issued by the viewing and changing permitting section 332 and the instruction to extract the portion other than the viewing-permitted portion issued by the viewing and changing prohibiting section 334, so as to extract the viewing-permitted portion from the file data. The viewing and editing control section 350 may supply the viewing-permitted portion of the file data to the second display control section 310.

In other words, the second display section 300 may display thereon the viewing-permitted portion of the file data.

The viewing and editing control section 350 opens the file data which is permitted to be viewed by the viewing and changing permitting section 332, or does not open the file data which is prohibited from being viewed by the viewing and changing prohibiting section 334. When the file data is permitted to be viewed, the viewing and editing control section 350 supplies the opened file data to the second display control section 310 and second communication control section 380. When the file data is prohibited from being viewed, the viewing and editing control section 350 does not supply the file data to the second communication control section 380. The viewing and editing control section 350 may not supply the file data to the second display control section 310 either, so as not to cause the second display section 300 to display thereon the file data.

The second display control section 310 causes the second display section 300 to display thereon the file data received from the viewing and editing control section 350. The second display section 300 displays thereon the file data under the control of the second display control section 310. The second communication control section 380 receives the changed contents of the file data from the viewing and editing control section 350, and causes the second communicating section 320 to transmit the received contents of the file data to the display apparatus 22. Here, the second communication control section 380 may cause the second communicating section 320 to only transmit, out of the entire contents of the file data, the portion changed by the user (i.e. difference data). The first communicating section 220 included in the display apparatus 22 receives the changed contents of the file data from the second communicating section 320, and supplies the received contents of the file data to the first display control section 2110. The first display control section 210 updates the file data displayed on the first display section 200 with the changed contents of the file data received from the first communicating section 220.

In the display system 10 relating to the present embodiment, the display apparatus 22 displaying thereon file data transmits, to the information processing apparatus 30, the information indicating whether the contents of the displayed file data are permitted to be changed or not. The information processing apparatus 30 can display thereon the file data in such a manner that the contents of the file data are permitted to be changed or prohibited from being changed. In this way, the display system 10 can restrict the change of the contents of the file data. As a result, the display system 10 can achieve improved security for the file data.

The display system 10 relating to the present embodiment can give permission to edit the file data by opening the file data with the use of editing-capable software, and, at the same time, can prohibit editing the file data by opening the file data with the use of editing-incapable software. In this way, the display system 10 can control whether to give permission to edit the file data, based on the application software to be activated by the information processing apparatus 30.

The display system 10 relating to the present embodiment can associate file data with a type of edition which is permitted to the file data. Therefore, even though the information processing apparatus 30 opens, by default, the file data with the use of application software which can change the contents of the file data, the information processing apparatus 30 can be controlled so as to open the file data in such a manner that a function of the application software which changes the contents of the file data is disabled. As a result, the display system 10 can impose detailed restrictions on the change of the contents of the file data.

The display system 10 relating to the present embodiment can give permission to change the contents of the file data, when the user identified by the user identifying information stored on the display apparatus 22 is the same as the user identified by the user identifying information obtained by the information processing apparatus 30. In this way, the display system 10 can prohibit a person other than the user who is truly permitted to change the contents of the file data displayed on the display apparatus 22 from changing the contents of the file data. As a result, the display system 10 can strengthen the protection against the change of the contents of the file data.

The display system, 10 relating to the present embodiment can associate each of a plurality of users with a type of edition which the user is permitted to perform on the file data. In this way, while a predetermined user is permitted to change the contents of the file data, a different user is prohibited from changing the contents of the file data. As a result, the display system 10 can accomplish higher security for the file data, and also improve the usability for the user.

The display system 10 relating to the present embodiment can define the viewing-permitted portion, permitted number of times of viewing, and viewing permission expiry limit, in association with each of a plurality of users. In this way, the file data can be prevented from being provided to each user beyond the permitted viewing level associated with the user. As a result, the display system 10 can improve the security for the file data, and also increase the usability for the user.

The display system 10 relating to the present embodiment can edit the file data within the display capability of the display apparatus 22. As a result, the display system 10 can flexibly edit the contents of the file data within the display capability of the display apparatus 22.

FIG. 4 illustrates an exemplary data structure of the storing unit 230 relating to the present embodiment. The user identifying information storing section 232 included in the storing unit 230 stores thereon the user identifying information which can uniquely identify the user. The file identifier storing section 234 stores thereon the file identifier which can uniquely identify the file data. The viewing and editing information storing section 236 stores thereon the type of editing-capable or editing-incapable software. The storing unit 230 may associate the user identifying information stored on the user identifying information storing section 232 with a file identifier and viewing and editing information. To be specific, the storing unit 230 stores thereon, in association with the user identifying information, a file identifier of file data which can be dealt by the user who is identified by the user identifying information. The storing unit 230 also stores thereon, in association with the user identifying information and file identifier, a type of application software which is used by the user identified by the user identifying information to open the file data identified by the file identifier at the information processing apparatus 30.

For example, a case is assumed where user identifying information 2000 identifying a predetermined user is associated with a file identifier 4000, and the combination of the user identifying information 2000 and file identifier 4000 is associated with viewing and editing information which includes editing-capable software (for example, word processor software 3000). In this case, the display apparatus 22 transmits, to the information processing apparatus 30, the user identifying information 2000, file identifier 4000 and type of editing-capable software included in the viewing and editing information (word processor software 3000). When the user judging section 360 judges that the user identifying information obtained by the user identifying information obtaining section 372 is the same as the user identifying information 2000 received from the display apparatus 22, the information processing apparatus 30 opens the file data identified by the file identifier 4000 with the use of the type of editing-capable software which is included in the viewing and editing information associated with the combination of the user identifying information 2000 and file identifier 4000, that is to say, the word processor software 3000. In this way, the information processing apparatus 30 can give permission to change the contents of the file data, to the user identified by the user identifying information 2000.

Here, a combination of the user identifying information 2000 and a file identifier 4010 is associated with viewing software 3010, which is a type of editing-incapable software included in the viewing and editing information. In this case, the display apparatus 22 transmits, to the information processing apparatus 30, the user identifying information 2000, file identifier 4010, and type of editing-incapable software included in the viewing and editing information including (viewing software 3010). When the user judging section 360 judges that the user identifying information obtained by the user identifying information obtaining section 372 is the same as the user identifying information 2000 received from the display apparatus 22, the information processing apparatus 30 opens the file data identified by the file identifier 4010 with the use of the type of editing-incapable software which is included in the viewing and editing information associated with the combination of the user identifying information 2000 and file identifier 4010, that is to say, the viewing software 3010. As a result, the information processing apparatus 30 can prohibit the user identified by the user identifying information 2000 from changing the contents of the file data.

When the user judging section 360 judges that the user identifying information obtained by the user identifying information obtaining section 372 is different from the user identifying information 2000 received from the display apparatus 22, the information processing apparatus 30 may not open the file data identified by the file identifier 4010 and display, on the second display section 300, notification saying that the file data can not be displayed. For example, when the user judging section 360 judges that the compared pieces of user identifying information are different from each other, the viewing and editing permission determining section 330 prohibits changing the contents of the file data, and then supplies information indicating the prohibition to the viewing and editing control section 350. Accordingly, the viewing and editing control section 350 nullifies all of the editing instructions received from the viewing and editing instruction obtaining section 370. Following this, the viewing and editing control section 350 may cause the second display control section 310 to display, on the second display section 300, notification indicating that the file data can not be displayed (for example, character string information such as "FILE DATA CAN NOT BE DISPLAYED.").

FIG. 5 illustrates an exemplary data structure of the storing unit 230 relating to the present embodiment. The user identifying information storing section 232 included in the storing unit 230 stores thereon user identifying information. The file identifier storing section 234 stores thereon a file identifier. The viewing and editing information storing section 236 stores thereon a type of edition which is permitted to be performed or prohibited from being performed on the file data. The storing unit 230 may associate the user identifying information stored on the user identifying information storing section 232 with a combination of a file identifier and viewing and editing information. To be specific, the storing unit 230 stores thereon, in association with user identifying information, a file identifier identifying file data which is permitted to be dealt by the user identified by the user identifying information. Furthermore, the storing unit 230 stores thereon viewing and editing information indicating a type of edition which the user identified by the user identifying information is permitted to perform or prohibited from performing on the file data identified by the file identifier.

For example, a case is assumed where user identifying information 2000 identifying a predetermined user is associated with a file identifier 4000. The combination of the user identifying information 2000 and file identifier 4000 is associated with a type of edition which is permitted to be performed on the file data identified by the file identifier 4000 (for example, the type of edition indicates that the file data is permitted to be viewed and saved but is prohibited from being printed out). The display apparatus 22 transmits, to the information processing apparatus 30, the user identifying information 2000, file identifier 4000, and the type of edition included in the viewing and editing information. When the user judging section 360 judges that the user identifying information obtained by the user identifying information obtaining section 372 is the same as the user identifying information 2000 received from the display apparatus 22, the viewing and editing permission determining section 330 included in the information processing apparatus 30 gives permission only to editing instructions corresponding to the type of edition associated with the combination of the user identifying information 2000 and file identifier 4000, among the editing instructions obtained by the viewing and editing instruction obtaining section 370.

For example, when the user judging section 360 judges that the user identifying information obtained by the user identifying information obtaining section 372 is the same as the user identifying information 2000, the viewing and changing permitting section 332 gives permission to view and save the file data identified by the file identifier 4000. In compliance with the permission issued by the viewing and changing permitting section 332, the viewing and editing control section 350 processes the contents of the file data in accordance with the user's editing instructions received from the viewing and editing instruction obtaining section 370. On the other hand, the viewing and changing prohibiting section 334 prohibits printing out the file data identified by the file identifier 4000. In compliance with the prohibition imposed by the viewing and changing prohibiting section 334, the viewing and editing control section 350 prohibits printing out the file data, among the user's editing instructions received from the viewing and editing instruction obtaining section 370.

As another example, a combination of the user identifying information 2000 and a file identifier 4010 is associated with viewing and editing information which indicates that the file data is permitted to be viewed, saved and printed out. In this case, when the user judging section 360 judges that the user identifying information obtained by the user identifying information obtaining section 372 is the same as the user identifying information 2000, the viewing and changing permitting section 332 gives permission to view, save and print out the file data identified by the file identifier 4010.

In a similar manner, when the user judging section 360 judges that the user identifying information obtained by the user identifying information obtaining section 372 is the same as user identifying information 2010, the viewing and changing permitting section 332 gives permission only to view the file data identified by the file identifier 4000. At the same time, the viewing and changing prohibiting section 334 prohibits saving and printing out the file data. Here, the combination of the user identifying information 2010 and file identifier 4010 is associated with viewing and editing information which indicates that the file data is prohibited from being viewed, saved and printed out. In this case, when the user judging section 360 judges that the user identifying information obtained by the user identifying information obtaining section 372 is the same as the user identifying information 2010, the viewing and changing prohibiting section 334 prohibits viewing, saving and printing out the file data identified by the file identifier 4010.

FIG. 6 illustrates an exemplary data structure of the display capability storing section 336 relating to the present embodiment. The display capability storing section 336 stores thereon display capabilities respectively in association with a plurality of apparatus identifiers. As the display capability, the display capability storing section 336 stores thereon, for example, the resolution, color display or monochrome display, or screen size.

Figure 7:
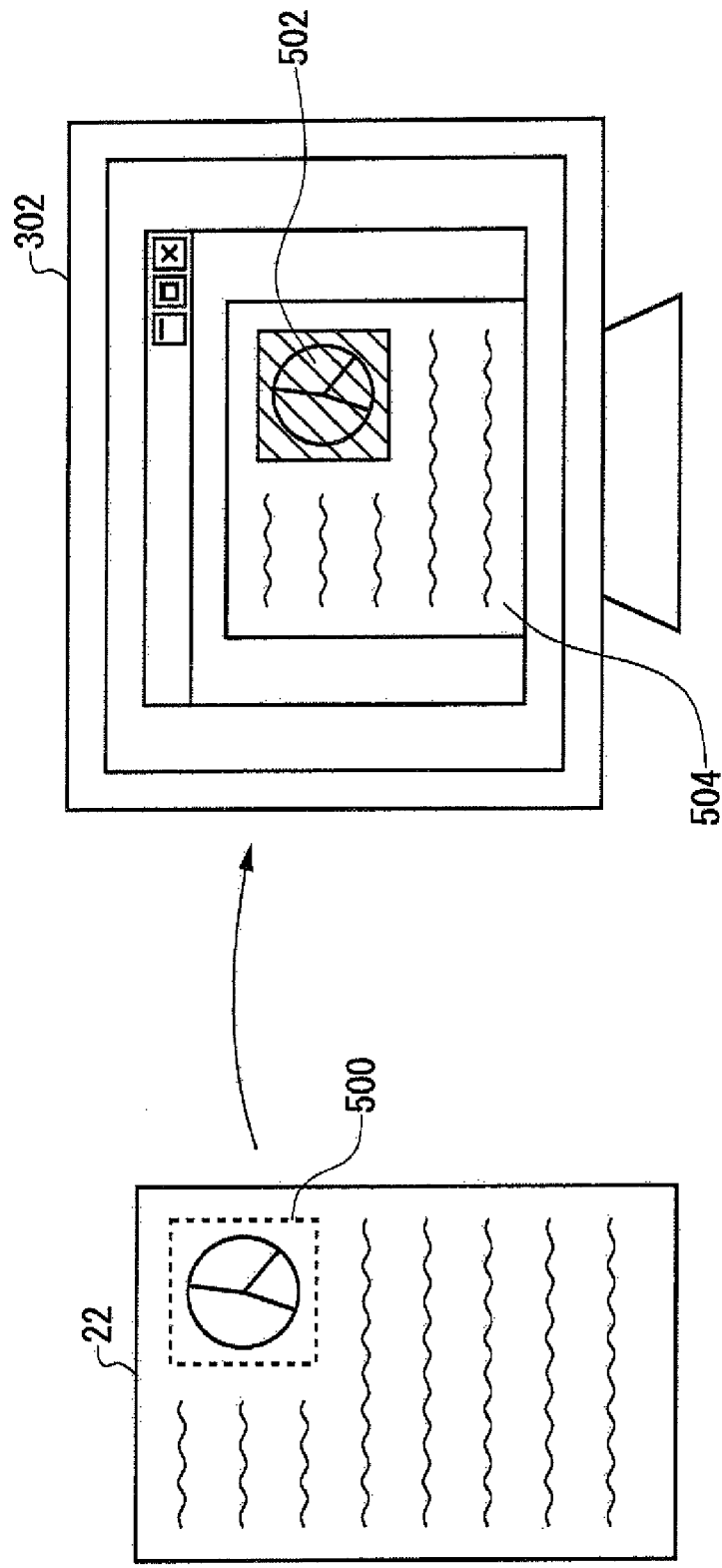
FIG. 7 illustrates an exemplary display realized by the display system 10.

FIG. 7 illustrates an exemplary display achieved by the display system 10 relating to the present embodiment. The display apparatus 22 displays thereon predetermined file data. Here, it is assumed that an editing-prohibited portion 500 is defined in the file data displayed on the display apparatus 22, where the contents in the editing-prohibited portion 500 are prohibited from being changed. The viewing and editing information storing section 236 of the display apparatus 22 stores thereon, as the viewing and editing information, an editing-permitted portion defined in the file data identified by a file identifier, where the contents in the editing-permitted portion are permitted to be changed. When the file data is document data, the editing-permitted portion may indicate part of a predetermined page, and one or more of a plurality of pages. When the file data is image data, the editing-permitted portion may indicate a predetermined region in the image data. Here, a plurality of editing-permitted portions may be defined in the file data.

The first communicating section 220 included in the display apparatus 22 transmits, to the second communicating section 320 included in the information processing apparatus 30, the viewing and editing information including the editing-permitted portion in association with the file identifier. The second communicating section 320 supplies the received file identifier to the file data obtaining section 340. The second communicating section 320 also supplies the received viewing and editing information to the viewing and editing permission determining section 330. The viewing and changing permitting section 332 of the viewing and editing permission determining section 330 gives permission to change the contents of the file data in the editing-permitted portion received by the second communicating section 320 based on the user's editing instructions obtained by the viewing and editing instruction obtaining section 370. On the other hand, the viewing and changing prohibiting section 334 prohibits changing the contents of the file data in a portion other than the editing-permitted portion based on the user's editing instructions obtained by the viewing and editing instruction obtaining section 370. The viewing and editing permission determining section 330 supplies, to the viewing and editing control section 350, the type of edition which is permitted by the viewing and changing permitting section 332 and information indicating that the viewing and changing prohibiting section 334 prohibits changing the contents of the file data in the portion other than the editing-permitted portion.

When the editing instructions transmitted from the viewing and editing instruction obtaining section 370 are directed to the editing-permitted portion 504 in the file data, the viewing and editing control section 350 accepts the transmitted editing instructions. On the other hand, when the editing instructions transmitted from the viewing and editing instruction obtaining section 370 are directed to a portion other than the editing-permitted portion 504 in the file data, the viewing and editing control section 350 does not accept the transmitted editing instructions. The viewing and editing control section 350 may receive information indicating the editing-permitted portion 504 from the viewing and editing permission determining section 330, and instruct the second display control section 310 to display the editing-prohibited portion 500, which is prohibited from being edited, with a shade 502 thereon. In his way, the user can easily understand which portion of the contents of the file data is prohibited from being changed.

According to the display system 10 relating to the present embodiment, a portion which is permitted to be edited can be defined in advance in the contents of the file data. Also, the display system 10 can distinctively display the portion in the contents of the file data which is prohibited from being edited. Based on these features, the display system 10 can strengthen the security for the file data, and improve the usability for the user.

Figure 8:
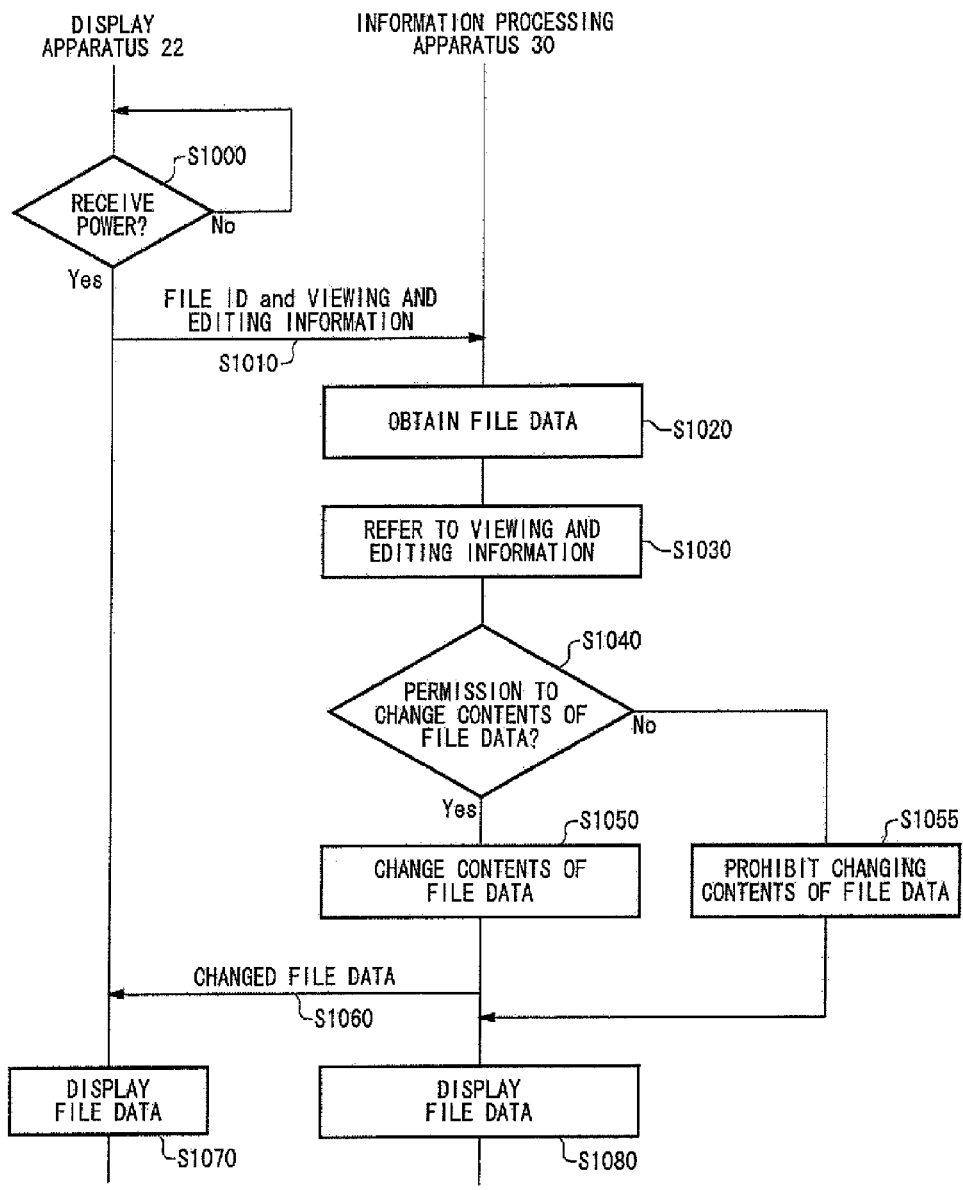
FIG. 8 is a flow chart illustrating a flow of operations performed by the display system 10.

FIG. 8 illustrates an exemplary flow of operations performed by the display system 10 relating to the present embodiment. To begin with, the display apparatus 22 is on standby until the power receiving section 240 receives power from the power feeding apparatus 40 (step S1000:NO). When the power receiving section 240 receives power (step S1000: YES), the first communicating section 220 uses the power received by the power receiving section 240 to make a request to the file identifier storing section 234 and viewing and editing information storing section 236, thereby obtaining a file identifier stored on the file identifier storing section 234 and viewing and editing information stored on the viewing and editing information storing section 236. The first communicating section 220 transmits, to the information processing apparatus 30, the obtained file identifier and viewing and editing information (step S1010).

The information processing apparatus 30 receives the file identifier at the second communicating section 320. The file data obtaining section 340 obtains, from the file data storing section 390 the file data identified by the file identifier received at the second communicating section 320 (step S1020). The file data obtaining section 340 supplies the obtained file data to the viewing and editing control section 350. Here, the viewing and editing permission determining section 330 refers to the viewing and editing information received at the second communicating section 320 (step S1030). The viewing and editing permission determining section 330 then determines whether it is permitted to change the contents of the file data obtained by the file data obtaining section 340 by referring to the viewing and editing information (step S1040).

When the contents of the file data are permitted to be changed, the viewing and changing permitting section 332 gives permission to change the contents of the file data. The viewing and editing control section 350 changes the contents of the file data based on the editing instructions received from the viewing and editing instruction obtaining section 370 (step S1050). The viewing and editing control section 350 supplies the file data whose contents have been changed to the second communication control section 380 and second display control section 310. The second communication control section 380 causes the second communicating section 320 to transmit the changed file data to the display apparatus 22 (step S1060). The display apparatus 22 updates the file data currently displayed on the first display section 200 with the changed file data which is received from the information processing apparatus 30, thereby causing the first display section 20 to display thereon the changed file data (step S1070).

When the contents of the file data are prohibited from being changed, the viewing and changing prohibiting section 334 prohibits changing the contents of the file data. In compliance with the prohibition imposed by the viewing and changing prohibiting section 334, the viewing and editing control section 350 prohibits changing the contents of the file data by not processing the contents of the file data based on the editing instructions received from the viewing and editing instruction obtaining section 370 (step S1055). Here, the viewing and editing control section 350 supplies the change made to the contents of the file data, to the second display control section 310. The second display control section 310 causes the second display section 300 to display thereon the changed or unchanged file data which is received from the viewing and editing control section 350 (step S1080).

Figure 9:
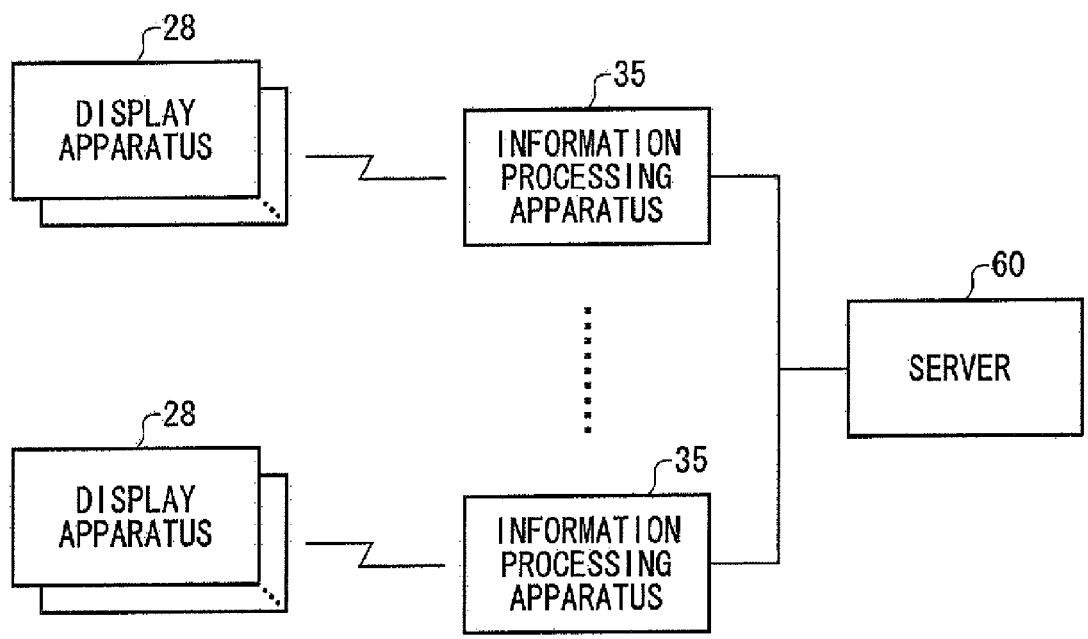
FIG. 9 is a schematic view illustrating a display system relating to another example.

FIG. 9 is a schematic view illustrating a different example of the display system relating to the present embodiment. The display system includes therein a plurality of display apparatuses 28, a plurality of information processing apparatuses 35, and a server 60. Each of the plurality of display apparatuses 28 communicates with a corresponding one of the plurality of information processing apparatuses 35. The plurality of information processing apparatuses 35 are connected to the server 60 via electric communication lines.

In this example of the display system, the display apparatuses 28 each may include, in the storing unit thereof, a functional configuration which is substantially the same as the display capability storing section 336 that is included in the information processing apparatus 30 described with reference to FIG. 3. Alternatively, the display apparatuses 28 each may have substantially the same functional configuration as the display apparatus 22 described with reference to FIG. 2.

Figure 10:
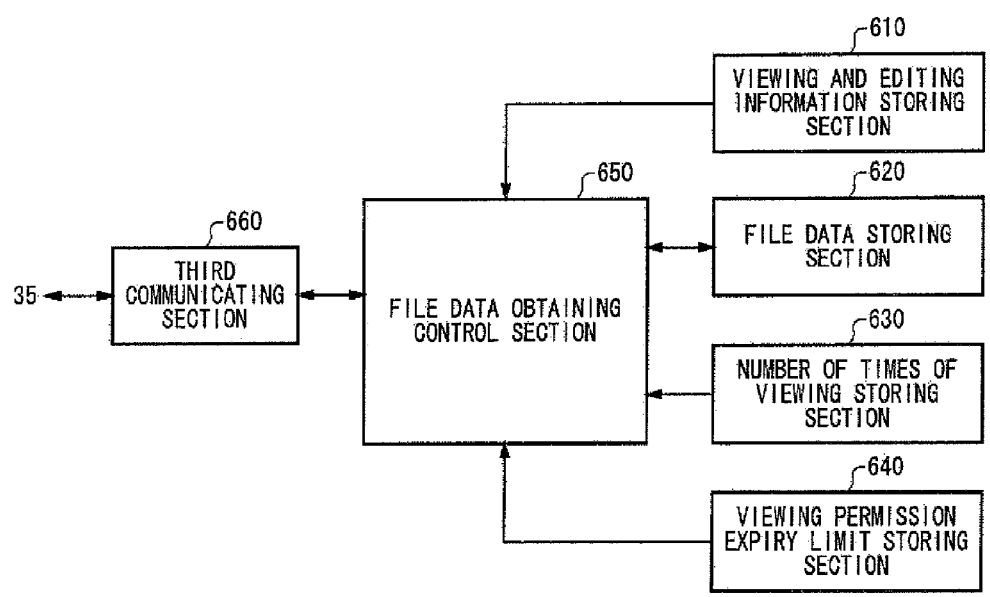
FIG. 10 is a block diagram illustrating the functional configuration of a server 60.

FIG. 10 illustrates the functional configuration of the server 60 relating to the present embodiment. The server 60 includes therein a viewing and editing information storing section 610, a file data storing section 620, a number of times of viewing storing section 630, a viewing permission expiry limit storing section 640, a file data obtaining control section 650, and a third communicating section 660. Here, the information processing apparatuses 35 each may include at least one of the viewing and editing information storing section 610, file data storing section 620, number of times of viewing storing section 630, and viewing permission expiry limit storing section 640.

The viewing and editing information storing section 610 included in the server 60 in the above example stores thereon the viewing and editing information stored on the viewing and editing information storing section 236 included in the display apparatus 22, except for the permitted number of times of viewing. The file data storing section 620 and number of times of viewing storing section 630 included in the server 60 respectively store thereon substantially the same information as the file data storing section 390 and number of times of viewing storing section 338 included in the information processing apparatus 30.

The viewing and editing information storing section 610 stores thereon, in association with a file identifier identifying file data, viewing and editing information indicating a type of viewing or editing which is permitted to be performed on the file data. The viewing permission expiry limit storing section 640 stores thereon, in association with a combination of a file data identifier identifying file data and a user identifier, a viewing permission expiry limit by which the file data is permitted to be viewed.

The file data obtaining control section 650 controls whether to permit the information processing apparatus 35 to obtain file data, based on a file identifier, a user identifier, an apparatus identifier, and the permitted number of times of viewing. To be specific, the file data obtaining control section 650 obtains, from the number of times of viewing storing section 630, the number of times of viewing the file data, in relation to the permitted number of times of viewing for the obtained file identifier. The file data obtaining control section 650 compares the permitted number of times of viewing and the number of times of viewing with each other, to judge whether to permit the information processing apparatus 35 to obtain the corresponding file data. Furthermore, the file data obtaining control section 650 compares the viewing permission expiry limit stored, in association with the file identifier, on the viewing permission expiry limit storing section 640 with the current date and time, to judge whether to permit the information processing apparatus 35 to obtain the corresponding file data. When the number of times of viewing does not exceed the permitted number of times of viewing, or when the current date and time does not exceed the viewing permission expiry limit, the file data obtaining control section 650 permits the information processing apparatus 35 to obtain the corresponding file data.

When judging that the information processing apparatus 35 is permitted to obtain the file data, the file data obtaining control section 650 obtains the file data from the file data storing section 620 based on the file identifier. Also, the file data obtaining control section 650 obtains, as the viewing and editing information corresponding to the file data identifier, at least one of: the type of editing-capable software for the file data; the type of editing-incapable software for the file data; the type of editing-capable or editing-incapable software associated with the user identifying information; the permitted type of edition; the permitted type of edition associated with the user identifying information; the editing-permitted portion, and viewing-permitted portion, which are all associated with the file data identifier. The file data obtaining control section 650 permits the information processing apparatus 35 to obtain the obtained file data and viewing and editing information, via the third communicating section 660.

The third communicating section 660 receives a file identifier, a user identifier, an apparatus identifier, and the permitted number of times of viewing, from the second communicating section 720 of the information processing apparatus 35, and supplies the received file identifier, user identifier, apparatus identifier, permitted number of times of viewing, to the file data obtaining control section 650. The third communicating section 660 obtains the file data and viewing and editing information from the file data obtaining control section 650, and transmits the obtained file data and viewing and editing information to the second communicating section 720 of the information processing apparatus 35.

Figure 11:
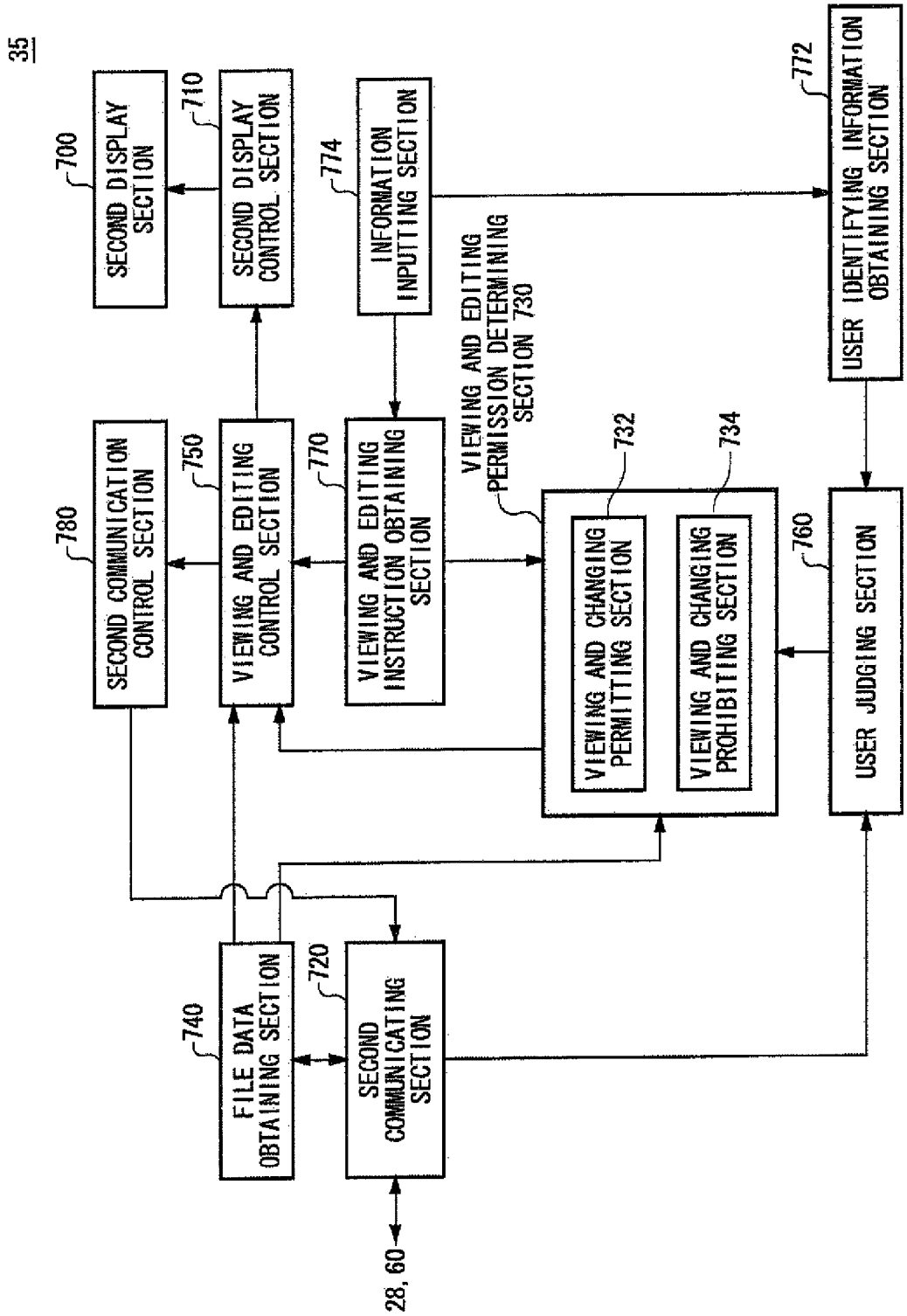
FIG. 11 is a block diagram illustrating the functional configuration of an information processing apparatus 35.

FIG. 11 illustrates the functional configuration of the information processing apparatus 35 relating to the present embodiment. The information processing apparatus 35 includes therein a second display section 700, a second display control section 710, a second communicating section 720, a viewing and editing permission determining section 730, a file data obtaining section 740, a viewing and editing control section 750, a user judging section 760, a viewing and editing instruction obtaining section 770, a user identifying information obtaining section 772, an information inputting section 774, and a second communication control section 780. The viewing and editing permission determining section 730 includes therein a viewing and changing permitting section 732 and a viewing and changing prohibiting section 734.

The second display section 700, second display control section 710, viewing and editing permission determining section 730, viewing and changing permitting section 732, viewing and changing prohibiting section 734, viewing and editing control section 750, user judging section 760, viewing and editing instruction obtaining section 770, user identifying information obtaining section 772, information inputting section 774, and second communication control section 780 respectively have substantially the same functions as the second display section 300, second display control section 310, viewing and editing permission determining section 330, viewing and changing permitting section 332, viewing and changing prohibiting section 334, viewing and editing control section 350, user judging section 360, viewing and editing instruction obtaining section 370, user identifying information obtaining section 372, information inputting section 374, and second communication control section 380 of the display apparatus 22 described with reference to FIG. 2.

The second communicating section 720 receives at least a file identifier from the display apparatus 28. The second communicating section 720 may also receive, from the display apparatus 28, a user identifier, an apparatus identifier, the permitted number of times of viewing, or display capability. The second communicating section 720 supplies the received file identifier, user identifier, apparatus identifier, permitted number of times of viewing, and display capability, to the file data obtaining section 740. Based on a request made by the file data obtaining section 740 to obtain file data, the second communicating section 720 transmits, to the server 60, the file identifier, user identifier, apparatus identifier, and permitted number of times of viewing. The second communicating section 720 receives the file data and viewing and editing information from the server 60, and supplies the received file data and viewing and editing information to the file data obtaining section 740. The second communicating section 720 transmits the file data to the display apparatus 28 under the control of the second communication control section 780.

Based on the file identifier, user identifier, apparatus identifier, and permitted number of times of viewing which are supplied from the second communicating section 720, the file data obtaining section 740 makes a request of file data to the server 60 via the second communicating section 720. The file data obtaining section 740 the obtains file data via the second communicating section 720, and supplies the obtained file data to the viewing and editing control section 750. The file data obtaining section 740 obtains a display capability and viewing and editing information via the second communicating section 720, and supplies the obtained display capability and viewing and editing information to the viewing and editing permission determining section 730.

The second communicating section 720 may transmit, to the server 60, a result of the judgment made by the user judging section 760 as to whether the compared pieces of user identifying information are the same. When the result of the judgment indicates that the compared pieces of user identifying information are different from each other, the server 60 may not transmit the file data to the information processing apparatus 35.

Figure 12:
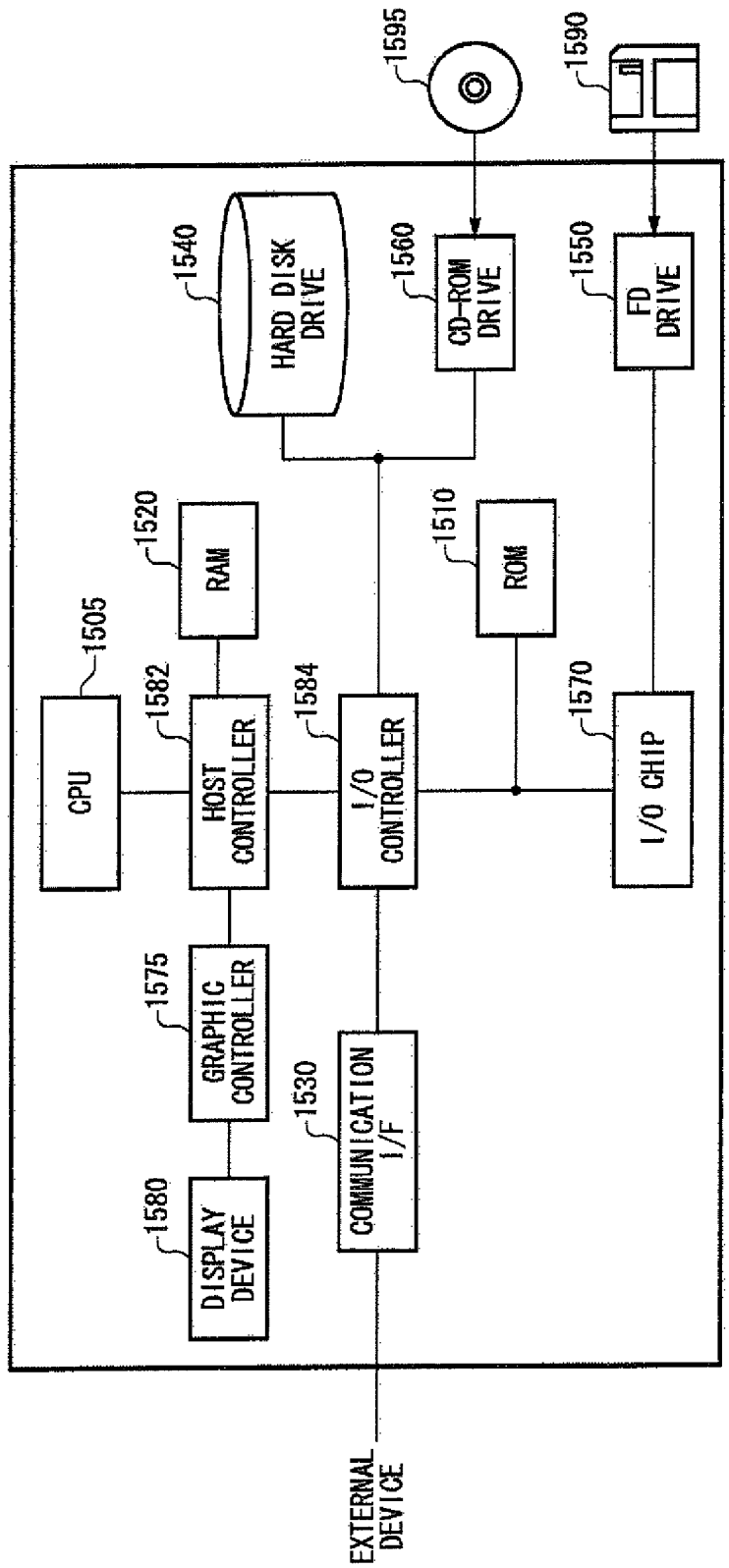
FIG. 12 is a block diagram illustrating the hardware configuration of a computer system.

FIG. 12 illustrates an exemplary hardware configuration of a computer system relating to the present embodiment. The computer system relating to the present embodiment is constituted by a CPU surrounding section, an input/output (I/O) section and a legacy I/O section. The CPU surrounding section includes a CPU 1505, a RAM 1520, a graphic controller 1575, and a display device 1580 which are connected to each other by means of a host controller 1582. The I/O section includes a communication interface (I/F) 1530, a hard disk drive 1540, and a CD-ROM drive 1560 which are connected to the host controller 1582 by means of an I/O controller 1584. The legacy I/O section includes a ROM 1510, a flexible disk drive 1550, and an I/O chip 1570 which are connected to the I/O controller 1584.

The host controller 1582 connects the RAM 1520 with the CPU 1505 and graphic controller 1575 which access the RAM 1520 at a high transfer rate. The CPU 1505 operates in accordance with programs stored on the ROM 1510 and RAM 1520, to control the constituents. The graphic controller 1575 obtains image data which is generated by the CPU 1505 or the like on a frame buffer provided within the RAM 1520, and causes the display device 1580 to display the obtained image data. Alternatively, the graphic controller 1575 may include therein a frame buffer for storing thereon image data generated by the CPU 1505 or the like.

The I/O controller 1584 connects, to the host controller 1582, the communication interface 1530, hard disk drive 1540 and CD-ROM drive 1560 which are I/O devices operating at a relatively high rate. The communication interface 1530 communicates with a different device via a network. The hard disk drive 1540 stores thereon programs and data to be used by the CPU 1505 provided in the computer system. The CD-ROM drive 1560 reads programs or data from a CD-ROM 1595, and supplies the read programs or data to the hard disk drive 1540 via the RAM 1520.

The I/O controller 1584 is also connected to the ROM 1510, flexible disk drive 1550 and I/O chip 1570 which are I/O devices operating at a relatively low rate. The ROM 1510 stores thereon a boot program executed by the computer system at the start up, programs unique to the hardware of the computer system, and the like. The flexible disk drive 1550 reads programs or data from a flexible disk 1590, and supplies the read programs or data to the hard disk drive 1540 via the RAM 1520. The I/O chip 1570 is used to connect a variety of I/O devices such as the flexible disk drive 1550 via, for example, a parallel port, a serial port, a keyboard port, a mouse port or the like.

A display program to be supplied to the hard disk drive 1540 via the RAM 1520 is provided by a user in a state of being stored on a recording medium such as the flexible disk 1590, CD-ROM 1595 and an IC card. The display program is read from the recording medium, installed via the RAM 1520 in the hard disk drive 1540 in the computer system, and executed by the CPU 1505.

The display program to be installed in and thus executed by the computer system causes the CPU 1505 and the like to operate the computer system as the display apparatus 22 described with reference to FIGS. 1 to 8 with the functions of the first display section 200, first display control section 210, first communicating section 220, file data communicating section 222, viewing and editing information communicating section 224, storing unit 230, user identifying information storing section 232, file identifier storing section 234, viewing and editing information storing section 236, apparatus identifier storing section 238, power receiving section 240, power feeding section 400, and power feeding control section 410 which are described with reference to FIGS. 1 to 8.

The display program to be installed in and thus executed by the computer system may cause the CPU 1505 and the like to operate the computer system as the information processing apparatus 30 described with reference to FIGS. 1 to 8 with the functions of the second display section 300, second display control section 310, second communicating section 320, viewing and editing permission determining section 330, viewing and changing permitting section 332, viewing and changing prohibiting section 334, display capability storing section 336, number of times of viewing storing section 338, file data obtaining section 340, viewing and editing control section 350, user judging section 360, viewing and editing instruction obtaining section 370, user identifying information obtaining section 372, information inputting section 374, second communication control section 380, and file data storing section 390 which are described with reference to FIGS. 1 to 8.

The display program to be installed in and thus executed by the computer system may cause the CPU 1505 and the like to operate the computer system as the information processing apparatus 35 described with reference to FIGS. 9 to 11 with the functions of the second display section 700, second display control section 710, second communicating section 720, viewing and editing permission determining section 730, viewing and changing permitting section 732, viewing and changing prohibiting section 734, file data obtaining section 740, viewing and editing control section 750, user judging section 760, viewing and editing instruction obtaining section 770, user identifying information obtaining section 772, information inputting section 774, and second communication control section 780 which are described with reference to FIGS. 9 to 11.

The display program to be installed in and thus executed by the computer system may cause the CPU 1505 and the like to operate the computer system as the server 60 described with reference to FIGS. 9 to 11 with the functions of viewing and editing information storing section 610, file data storing section 620, number of times of viewing storing section 630, viewing permission expiry limit storing section 640, file data obtaining control section 650 and third communication control section which are described with reference to FIGS. 9 to 11.

As is apparent from the above description, an embodiment of the present invention can display the file data on the information processing apparatus in such a manner that the file data is displayed on the display apparatus and the contents of the file data are permitted to be changed or prohibited from being changed.

While one aspect of the present invention has been described through the embodiment, the technical scope of the invention is not limited to the above described embodiment. It is apparent to persons skilled in the art that various alternations and improvements can be added to the above-described embodiment. It is also apparent from the scope of the claims that the embodiments added with such alternations or improvements can be included in the technical scope of the invention.

What is claimed is:

1. A display system comprising:
  a display apparatus that displays thereon file data and is selected from a group consisting of sheets of electronic paper, flexible displays, sheets of rewritable paper, paper-like displays, sheets of digital paper, electronic sheets, and electronic display sheets;
  an information processing apparatus that enables a user to view or edit the file data displayed on the display apparatus;
  a power feeding apparatus that feeds power to the display apparatus by generating a magnetic field within a predetermined range; and
  a power feeding control section that detects a variation in a state of the magnetic field generated by the power feeding apparatus, wherein
  the display apparatus includes:
    a file identifier storing section that stores thereon a file identifier identifying the file data;
    a viewing and editing information storing section that stores thereon viewing and editing information which indicates a type of viewing or editing which is permitted to be performed on the file data identified by the file identifier stored on the file identifier storing section;
    a first display section that displays thereon the file data identified by the file identifier stored on the file identifier storing section;
    a first communicating section that transmits, to the information processing apparatus, the file identifier stored on the file identifier storing section and the viewing and editing information stored on the viewing and editing information storing section; and
    a power receiving section that receives the power from the magnetic field generated by the power feeding apparatus, and
    when the display apparatus is placed within the predetermined range so that the power receiving section receives the power, the first communicating section uses the received power to transmit, to the information processing apparatus, the file identifier stored on the file identifier storing section and the viewing and editing information stored on the viewing and editing information storing section;
  the information processing apparatus includes:
    a second communicating section that receives the file identifier stored on the file identifier storing section and the viewing and editing information stored on the viewing and editing information storing section;
    a file data obtaining section that obtains the file data identified by the file identifier received by the second communicating section;
    a viewing and editing instruction obtaining section that obtains one or more instructions issued by the user to view or edit the file data;
    a viewing and changing permitting section that refers to the viewing and editing information received by the second communicating section, and when the file data obtained by the file data obtaining section is permitted to be viewed or edited, gives permission to view or change contents of the file data based on the viewing or editing instructions obtained by the viewing and editing instruction obtaining section; and
    a viewing and changing prohibiting section that refers to the viewing and editing information received by the second communicating section, and, when the file data obtained by the file data obtaining section is not permitted to be viewed or edited, prohibits viewing or changing the contents of the file data; and
  the viewing and editing information storing section stores thereon, as the viewing and editing information, and editing-permitted portion of the file data displayed on the display apparatus and identified by the file identifier stored on the file identifier storing section, whose contents are permitted to be changed;
  the first communicating section transmits, as the viewing and editing information, the editing-permitted portion stored on the viewing and editing information storing section;

the second communication section receives, as the viewing and editing information, the editing-permitted portion stored on the viewing and editing information storing section;

the viewing and changing permitting section gives permission to change the contents of the file data in the editing-permitted portion received by the second communicating section based on the editing instructions obtained by the viewing and editing instruction obtaining section; and the viewing and changing prohibiting section prohibits changing the contents of the file data in a portion other than the editing-permitted portion received by the second communicating section based on the editing instructions obtained by the viewing and editing instruction obtaining section.

2. The display system as set forth in claim 1, wherein the viewing and editing information storing section stores thereon, as the viewing and editing information, (i) a type of editing-capable software which is application software capable of changing the contents of the file data or (ii) a type of editing-incapable software which is application software incapable of changing the contents of the file data, the first communicating section transmits, as the viewing and editing information, the type of editing-capable or editing-incapable software stored on the viewing and editing information storing section, the second communicating section receives, as the viewing and editing information, the type of editing-capable or editing-incapable software stored on the viewing and editing information storing section, the viewing and changing permitting section gives permission to change the contents of the file data, by opening the file data obtained by the file data obtaining section by using the type of editing-capable software which is received by the second communicating section, and the viewing and changing prohibiting section prohibits changing the contents of the file data, by opening the file data obtained by the file data obtaining section by using the type of editing-incapable software which is received by the second communicating section.

3. The display system as set forth in claim 2, wherein the display apparatus further includes:
　a user identifying information storing section that stores thereon user identifying information identifying the user; and the information processing apparatus further includes:
　a user identifying information obtaining section that obtains user identifying information input by the user; and
　a user judging section that judges whether the user identifying information obtained by the user identifying information obtaining section is the same as the user identifying information stored on the user identifying information storing section; and the first communicating section further transmits the user identifying information stored on the user identifying information storing section;

the second communicating section further receives the user identifying information stored on the user identifying information storing section;

the user judging section judges whether the user identifying information obtained by the user identifying information obtaining section is the same as the user identifying information received by the second communicating section; and when the user judging section judges positively, the viewing and changing permitting section gives permission to change the contents of the file data by opening the file data obtained by the file data obtaining section by using the type of editing-capable software received by the second communication section; and when the user judging section judges negatively, the viewing and changing prohibiting section prohibits changing the contents of the file data by opening the file data obtained by the file data obtaining section by using the type of editing-incapable software received by the second communicating section.

4. The display system as set forth in claim 3, wherein the user identifying information storing section stores thereon a plurality of pieces of user identifying information respectively identifying a plurality of users, the viewing and editing information storing section stores thereon, as the viewing and editing information, (i) the type of editing-capable software which is application software capable of changing the contents of the file data or (ii) the type of editing-incapable software which is application software incapable of changing the contents of the file data, in association with each of the plurality of pieces of user identifying information stored on the user identifying information storing section, the first communicating section transmits the plurality of pieces of user identifying information stored on the user identifying information storing section, and, as the viewing and editing information, the type of editing-capable or editing-incapable software stored on the viewing and editing information storing section in association with each of the plurality of pieces of user identifying information, the second communicating section receives the plurality of pieces of user identifying information stored on the user identifying information storing section, and, as the viewing and editing information, the type of editing-capable or editing-incapable software stored on the viewing and editing information storing section in association with each of the plurality of pieces of user identifying information, the user judging section judges which one of the plurality of pieces of user identifying information received by the second communicating section is the same as the user identifying information obtained by the user identifying information obtaining section, and the viewing and changing permitting section gives permission to change the contents of the file data obtained by the file data obtaining section by opening the file data by using the type of editing-capable software which is received by the second communicating section and is associated with the piece of user identifying information that is judged to be the same as the user identifying information obtained by the user identifying information obtaining section.

5. The display system as set forth in claim 1, wherein the viewing and editing information storing section stores thereon, as the viewing and editing information, a type of edition which is permitted to be performed on the file data identified by the file identifier stored on the file identifier storing section, the first communicating section transmits, as the viewing and editing information, the permitted type of edition which is stored on the viewing and editing information storing section, the second communicating section receives, as the viewing and editing information, the permitted type of edition which is stored on the viewing and editing information storing section, the viewing and changing permitting section gives permission to change the contents of the file data based on an editing instruction, among the editing instructions obtained by the viewing and editing instruction obtaining section, which is included in the permitted type of edition received by the second communicating section, and the viewing and changing prohibiting section prohibits changing the contents of the file data based on an editing instruction, among the editing instructions obtained by the viewing and editing instruction obtaining section, which is not included in the permitted type of edition received by the second communicating section.

6. The display system as set forth in claim 5, wherein the display apparatus further includes:
 a user identifying information storing section that stores thereon user identifying information identifying the user; and the information processing apparatus further includes:
 a user identifying information obtaining section that obtains user identifying information input by the user; and
 a user judging section that judges whether the user identifying information obtained by the user identifying information obtaining section is the same as the user identifying information stored on the user identifying information storing section; and the first communication section transmits the user identifying information stored on the user identifying information storing section and the permitted type of edition stored on the viewing and editing information storing section;

the second communication section receives the user identifying information stored on the user identifying information storing section and the permitted type of edition stored on the viewing and editing information storing section; and the user judging section judges whether the user identifying information obtained by the user identifying information obtaining section is the same as the user identifying information received by the second communicating section, and when the user judging section judges positively, the viewing and changing permitting section gives permission to change the contents of the file data based on an editing instruction, among the editing instructions obtained by the viewing and editing instruction obtaining section, which is included in the permitted type of edition received by the second communicating section and is permitted to the user, and when the user judging section judges negatively, the viewing and changing prohibiting section prohibits changing the contents of the file data.

7. The display system as set forth in claim 6, wherein the user identifying information storing section stores thereon a plurality of pieces of user identifying information respectively identifying a plurality of users, the viewing and editing information storing section stores thereon, as the viewing and editing information, the type of edition which is permitted to be performed on the file data identified by the file identifier stored on the file identifier storing section, in association with each of the plurality of pieces of user identifying information stored on the user identifying information storing section, the first communicating section transmits the plurality of pieces of user identifying information stored on the user identifying information storing section, and the permitted type of edition stored on the viewing and editing information storing section in association with each of the plurality of pieces of user identifying information, the second communicating section receives the plurality of pieces of user identifying information stored on the user identifying information storing section, and the permitted type of edition stored on the viewing and editing information storing section in association with each of the plurality of pieces of user identifying information, the user judging section judges which one of the plurality of pieces of user identifying information received by the second communicating section is the same as the user identifying information obtained by the user identifying information obtaining section, and when the user judging section judges that one of the plurality of pieces of user identifying information is the same as the user identifying information obtained by the user identifying information obtaining section, the viewing and changing permitting section gives permission to change the contents of the file data based on an editing instruction, among the editing instructions obtained by the viewing and editing instruction obtaining section, which is (i) included in the permitted type of edition received by the second communicating section and associated with the piece of user identifying information judged to be the same as the user identifying information obtained by the user identifying information obtaining section and (ii) is permitted to the user.

8. The display system as set forth in claim 1, wherein the information processing apparatus further includes:
 a viewing and editing control section that, when the viewing and changing permitting section gives permission to change the contents of the file data, changes the contents of the file data based on the editing instructions obtained by the viewing and editing instruction obtaining section; and
 a second communication control section that, when the contents of the file data are changed by the viewing and editing control section, causes the second communicating section to transmit the changed contents of the file data to the first communicating section; and the display apparatus further includes:
 a first display control section that updates the file data displayed on the first display section with the changed contents of the file data received by the first communicating section.

9. The display system as set forth in claim 1, wherein the viewing and editing information storing section stores thereon, as the viewing and editing information, a viewing-permitted portion, of the file data identified by the file identifier stored on the file identifier storing section, whose contents are permitted to be viewed, the first communicating section transmits, as the viewing and editing information, the viewing-permitted portion stored on the viewing and editing information storing section, the second communicating section receives, as the viewing and editing information, the viewing-permitted portion stored on the viewing and editing information storing section, the viewing and changing permitting section gives permission to view the contents of the file data in the viewing-permitted portion received by the second communicating section based on the viewing instructions obtained by the viewing and editing instruction obtaining section, and the viewing and changing prohibiting section prohibits viewing the contents of the file data in a portion other than the viewing-permitted portion received by the second communicating section based on the viewing instructions obtained by the viewing and editing instruction obtaining section.

10. The display system as set forth in claim 9, wherein the information processing apparatus further includes:
   a viewing and editing control section that extracts, from the file data, the viewing-permitted portion whose contents are permitted to be viewed by the viewing and changing permitting section; and
   the second communication section transmits the viewing-permitted portion extracted by the viewing and editing control section to the display apparatus, so as to cause the first display section to display thereon the extracted viewing-permitted portion.

11. The display system as set forth in claim 1, wherein the viewing and editing information storing section stores thereon, as the viewing and editing information, a permitted number of times of viewing at which the file data identified by the file identifier stored on the file identifier storing section is permitted to be viewed,
   the first communicating section transmits, as the viewing and editing information, the permitted number of times of viewing stored on the viewing and editing information storing section,
   the second communicating section receives, as the viewing and editing information, the permitted number of times of viewing stored on the viewing and editing information storing section, and
   the viewing and changing permitting section gives permission to view the contents of the file data in accordance with the permitted number of times of viewing which is received by the second communicating section, or the viewing and changing prohibiting section prohibits viewing the contents of the file data in accordance with the permitted number of times of viewing which is received by the second communicating section.

12. The display system as set forth in claim 1, wherein the viewing and editing information storing section stores thereon, as the viewing and editing information, a viewing permission expiry limit by which the file data identified by the file identifier stored on the file identifier storing section is permitted to be viewed,
   the first communicating section transmits, as the viewing and editing information, the viewing permission expiry limit stored on the viewing and editing information storing section,
   the second communicating section receives, as the viewing and editing information, the viewing permission expiry limit stored on the viewing and editing information storing section, and
   the viewing and changing permitting section gives permission to view the contents of the file data in accordance with the viewing permission expiry limit which is received by the second communicating section, or the viewing and changing prohibiting section prohibits viewing the contents of the file data in accordance with the viewing permission expiry limit which is received by the second communicating section.

13. The display system as set forth in claim 1, wherein the display apparatus further includes:
   an apparatus identifier storing section that stores thereon an apparatus identifier identifying the display apparatus; and
   the information processing apparatus further includes:
   a display capability storing section that stores thereon a display capability of the display apparatus in association with the apparatus identifying the display apparatus; and
   the first communicating section further transmits the apparatus identifier stored on the apparatus identifier storing section to the information processing apparatus;
   the second communicating section further receives the apparatus identifier stored on the apparatus identifier storing section; and
   the viewing and changing permitting section gives permission to change the contents of the file data within the display capability which is stored on the display capability storing section in association with the apparatus identifier received by the second communicating section.

14. The display system as set forth in claim 1, wherein the information processing apparatus further includes:
   a viewing and editing permission determining section that includes the viewing and changing permitting section and the viewing and changing prohibiting section therein;
   a viewing and editing control section that receives information indicating the editing-permitted portion from the viewing and editing permission determining section;
   a second display section that displays thereon the file data; and
   a second display control section that causes the second display section to display thereon the file data received from the viewing and editing control section,
   wherein said viewing and editing control section instructs the second display control section to display an editing-prohibited portion with a shade thereon.

* * * * *